US012694096B2

(12) United States Patent
Narayan et al.

(10) Patent No.: US 12,694,096 B2
(45) Date of Patent: Jul. 28, 2026

(54) AUTO GENERATE SECURITY SDK CODE INJECTIONS INTO CUSTOM APPLICATION FOR RUN TIME LLM PROTECTION

(71) Applicant: Palo Alto Networks, Inc., Santa Clara, CA (US)

(72) Inventors: Krishnan Shankar Narayan, San Jose, CA (US); Srikumar Narayan Chari, Cupertino, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

(21) Appl. No.: 18/758,243

(22) Filed: Jun. 28, 2024

(65) Prior Publication Data

US 2026/0003954 A1     Jan. 1, 2026

(51) Int. Cl.
*G06F 21/00*          (2013.01)
*G06F 21/54*          (2013.01)

(52) U.S. Cl.
CPC ........ *G06F 21/54* (2013.01); *G06F 2221/033* (2013.01)

(58) Field of Classification Search
None
See application file for complete search history.

(56) References Cited

U.S. PATENT DOCUMENTS

| | | |
|---|---|---|
| 2016/0212209 A1 | 7/2016 | Qian |
| 2017/0109349 A1 | 4/2017 | Rosen |
| 2017/0329621 A1 | 11/2017 | Beckett |

| | | | |
|---|---|---|---|
| 2021/0073015 A1 | 3/2021 | Dowling | |
| 2024/0054233 A1* | 2/2024 | Ohayon | ......... G06F 21/54 |
| 2025/0028994 A1* | 1/2025 | Rathi | ......... G06N 20/00 |
| 2025/0123902 A1* | 4/2025 | Long | ......... G06F 9/5083 |
| 2025/0124640 A1* | 4/2025 | Lorraine | ......... G06T 7/97 |
| 2025/0131261 A1* | 4/2025 | Harang | ......... G06N 20/00 |
| 2025/0173550 A1* | 5/2025 | Scherle | ......... G06N 3/0455 |
| 2025/0181836 A1* | 6/2025 | Mehrotra | ......... G06F 21/577 |
| 2025/0190801 A1* | 6/2025 | Lucas | ......... G06N 3/0475 |
| 2025/0232187 A1* | 7/2025 | Long | ......... G06N 5/01 |

(Continued)

FOREIGN PATENT DOCUMENTS

| | | |
|---|---|---|
| CN | 111708539 | 7/2021 |

OTHER PUBLICATIONS

Lancia, Julien. Detecting fault injection vulnerabilities in binaries with symbolic execution. 2022 14th International Conference on Electronics, Computers and Artificial Intelligence (ECAI). https://ieeexplore.ieee.org/stamp/stamp.jsp?tp=&arnumber=9847500 (Year: 2022).*

(Continued)

*Primary Examiner* — Jeremiah L Avery
(74) *Attorney, Agent, or Firm* — Van Pelt, Yi & James LLP

(57) ABSTRACT

The present application discloses a method, system, and computer system for securing code. The method includes (i) obtaining a code sample, (ii) detecting a call flow associated with the code sample, (iii) determining whether to inject a software development kit (SDK) to the code sample based at least in part on the call flow, and (iv) in response to determining to inject the SDK to the code sample: (a) automatically injecting the SDK to the code sample to obtain an SDK-injected code sample, and (b) providing the SDK-injected code sample.

24 Claims, 14 Drawing Sheets

(56) References Cited

U.S. PATENT DOCUMENTS

| | | | | |
|---|---|---|---|---|
| 2025/0244959 A1* | 7/2025 | Schiffman | ................. | G06F 8/33 |
| 2025/0258685 A1* | 8/2025 | Crabtree | ................. | A63F 13/40 |
| 2025/0259144 A1* | 8/2025 | Crabtree | ........... | G06Q 30/0601 |
| 2025/0265298 A1* | 8/2025 | Crabtree | ................. | G09B 21/00 |
| 2025/0278575 A1* | 9/2025 | Vasseur | ............... | G06N 3/0455 |
| 2025/0321768 A1* | 10/2025 | Schuetz | .............. | G06N 3/0895 |

OTHER PUBLICATIONS

Zhao, Gang et al. Data-Flow Based Analysis of Java Bytecode Vulnerability. 2008 The Ninth International Conference on Web-Age Information Management. https://ieeexplore.ieee.org/stamp/stamp.jsp?tp=&arnumber=4597080 (Year: 2008).*

Qu, Zhengyang et al. DyDroid: Measuring Dynamic Code Loading and Its Security Implications in Android Applications. 2017 47th Annual IEEE/IFIP International Conference on Dependable Systems and Networks (DSN). https://ieeexplore.ieee.org/stamp/stamp.jsp?tp=&arnumber=8023141 (Year: 2017).*

* cited by examiner

300

400

```
llm_chain = LLMChain(
    llm = llm,
    prompt=PromptTemplate.from_template(prompt_template)
)
total_tokens = num_tokens_from_string(prompt_template, 'davinci')\
            + num_tokens_from_string(question, 'davinci') \
            + num_tokens_from_string(response, 'davinci')

return llm_chain.predict(question=question, answer=response), total_tokens
```

FIG. 4A

```
import prisma_code as pc llm_chain = LLMChain(
    llm=llm,
    prompt = PromptTemplate.from_template(prompt_template)
)
total_tokens = num_tokens_from_string(prompt_template, 'davinci') \
              + num_tokens_from_string(question, 'davinci') \
              + num_tokens_from_string(response, 'davinci')

response = llm_chain.predict(question=question, answer=response)

new*
@pc.intercept
def interceptor(prompt, repsonse):

analyze prompt and response return response analyzed_response = interceptor(prompt_template, response)

return analyzed_response, total_tokens
```

AUTO GENERATE SECURITY SDK CODE INJECTIONS INTO CUSTOM APPLICATION FOR RUN TIME LLM PROTECTION

BACKGROUND OF THE INVENTION

Protecting cloud-to-cloud workflows from vulnerabilities in network security applications involves implementing a multi-layered security approach that addresses various potential risks. Examples of some strategies for protecting cloud-to-cloud workflows include (a) data encryption, (b) identity and access management (IAM), (c) network security, (d) monitoring and logging to detect suspicious activity, (e) application security, (f) incident response and recovery, (g) implementing zero trust architecture, (h) API security, and (i) improving developer and employee awareness.

Application security techniques may include implementing secure development practices, patch management, and/or web application firewalls. The secure development practice may include incorporating security best practices in the software development lifecycle (SDLC), including code reviews and vulnerability scanning. The patch management may include performing regular updates and patches to software and applications to mitigate known vulnerabilities. The web application firewalls can be deployed to protect against common web exploits.

BRIEF DESCRIPTION OF THE DRAWINGS

Various embodiments of the invention are disclosed in the following detailed description and the accompanying drawings.

FIG. 4A is an example of a code sample.

FIG. 4B is an example of an SDK-injected code sample according to various embodiments.

DETAILED DESCRIPTION

Figure 1:
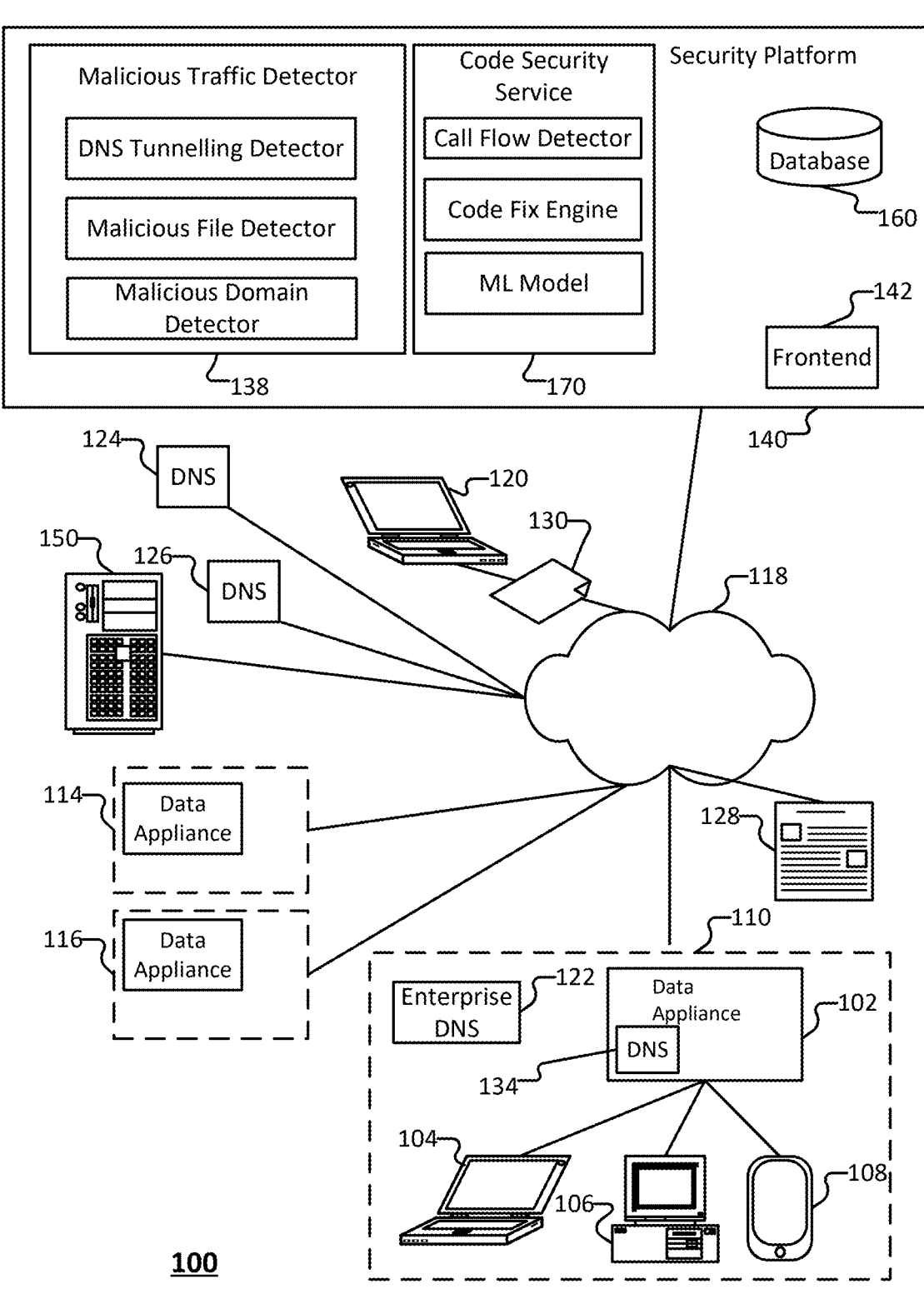
FIG. 1 is a block diagram of an environment for providing a security service according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a security entity (or security device) is a network node (e.g., a device) that enforces one or more security policies with respect to information such as network traffic, files, etc. As an example, a security entity may be a firewall. As another example, a security entity may be implemented as a router, a switch, a DNS resolver, a computer, a tablet, a laptop, a smartphone, etc. Various other devices may be implemented as a security entity. As another example, a security may be implemented as an application running on a device, such as an anti-malware application. The security entity may communicate with a cloud service (e.g., security platform 140) to perform workloads such as to provide security services.

A security entity (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

As used herein, a software development kit (SDK) may include a collection of software tools, libraries, documentation, code samples, and APIs (Application Programming Interfaces) that developers use to create applications for specific platforms, frameworks, or devices. SDKs provide the necessary components and utilities to streamline the development process, enabling developers to build applications more efficiently and effectively.

As used herein, a call flow may include the sequence and hierarchy of function or method calls that occur during the execution of a program. Essentially, a call flow maps out how different parts of the code interact with each other through function calls, showing the path taken from one function to another as the program runs. This can include direct function calls, recursive calls, and calls to external libraries or services.

As used herein, injection of an SDK may include integrating the SDK's libraries and functionalities into a development project. This process can vary depending on the programming language, the SDK, and the development environment. General steps and examples for some common languages and environments include: (a) selecting the correct SDK, such as based on functionality, platform, or service integration, or various other factors; (b) setting up the development environment, the technique for which may include installing specific tools, package managers, or build systems; and (c) including the SDK in the development project, the technique for which can vary based on programming language and platform; and (d) configuring the SDK (such as setting API keys, authentication credentials, or other parameters), the technique for which can be completed, for example, through configuration files or directly in the code.

In cloud based environments, securing code is a critical functionality to reduce the vulnerability exposure to cloud services (e.g., cloud-to-cloud services) provided based on the secure code. A set of core principles for a security product or service include (a) the technique used for the security product to be integrated inline with a request (e.g., a cloud-to-cloud request), and/or (b) the technique used for the security product to be integrated with the environment Various embodiments provide a method, system, and computer system for securing code. The method includes (i) obtaining a code sample, (ii) detecting a call flow associated with the code sample, (iii) determining whether to inject a software development kit (SDK) to the code sample based at least in part on the call flow, and (iv) in response to determining to inject the SDK to the code sample: (a) automatically injecting the SDK to the code sample to obtain an SDK-injected code sample, and (b) providing the SDK-injected code sample.

Various related art techniques for protecting cloud-to-cloud workflows include (a) implementing data encryption, (b) implementing identity and access management, (c) implementing network security, (d) implementing monitoring and logging, (e) implementing compliance and governance (e.g., policy enforcement, performing audits and assessments, etc.), (f) implementing application security, (g) implementing incident response and recovery, (h) implementing a zero trust architecture, (i) implementing API security (e.g., using secure API gateways, authentication and authorization, and/or rate limiting), and (j) implementing collaboration and training among developers.

Ensuring application security may include implementing secure development practice, patch management, and/or web application firewalls (WAFs). Secure development may include incorporating security best practices in the software development lifecycle (SDLC), including code reviews and vulnerability scanning. Patch management may include regularly updating and patching software and applications to mitigate known vulnerabilities. Security via WAFs may include deploying WAFs to protect against common web exploits.

Code security can be implemented by performing one or more of a software bill of materials (SBOM) detection, a vulnerability analysis, a reachability analysis, security checks, an analysis of whether packages are being downloaded during a cloud-to-cloud pipeline, and monitoring a container or performing a runtime analysis.

Some related art systems implement a proxy solution (e.g., a reverse proxy) as the technique for security products to be integrated inline with requests. However, proxy solutions provide very limited functionality. For example, proxy solutions are generally limited to blocking or permitting requests/traffic, and logging/monitoring behavior. Proxy solutions generally do not enable security with respect to certain dynamic behavior. For example, proxy solutions cannot take evasive action with respect to vulnerabilities, and proxy solutions are generally unable to drive workflows or change the workload. Because the proxy solution analyzes the traffic at a packet level and in a stateless manner, the proxy solution does not have insight into any context and thus does not provide security based on the context.

Another technique that an enterprise may implement to provide cloud-to-cloud security is the mandating of its developers use SDKs in the development of code. SKDs are tools that provide developers with a set of software components, libraries, documentation, and examples that facilitate the creation of applications on specific platforms. Traditionally, integrating SDKs into a software project requires manual effort. Developers must identify where and how to include SDKs, configure them correctly, and ensure they are properly maintained throughout the software lifecycle. Further, certain SDKs are built for certain languages or for certain form factors. For example, some SDKs are more ideal for Spark jobs, some SDKs are more ideal for JavaScript applications, etc. Accordingly, upon an enterprise mandating that developers use a particular SDK (or set of SDKs), the developer generally has to analyze and learn the SDK and determine how to integrate the SDK into the code.

Manual SDK integration is often time-consuming and error-prone, especially in complex projects with numerous dependencies and frequent updates. Additionally, different parts of an application may require different SDKs, or the same SDK may need to be used in multiple contexts, necessitating extensive code changes and configuration management.

Related art techniques for SDK integration face several challenges, including manual integration, static analysis limitations, configuration complexity, and possibly also performance overhead. With respect to manual integration, developers need to manually identify where SDKs should be included in the code, which can be tedious and prone to errors. With respect to static analysis limitations, static analysis tools can provide insights into code structure but do not dynamically adjust to changes in codebase or runtime behavior. With respect to configuration complexity, integrating and configuring multiple SDKs in large projects can lead to complex and difficult-to-maintain build configurations. With respect to performance overhead, inefficient integration of SDKs (or redundant SDK integration) can lead to performance degradation due to redundant or unnecessary SDK calls.

Accordingly, related art techniques for implementing SDK integration to enhance security is inefficient and costly. Therefore, SDK-integration has an adoption problem among developers, and it is very difficult for enterprises to mandate code usage or ensure code correctness (e.g., to ensure that the SDKs are properly integrated into the code).

According to various embodiments, the system detects call flows in code (e.g., the codebase), determines corresponding code samples (e.g., the code respectively associated with the various call flows), and automatically integrates one or more SDKs into a subset of the code samples. For example, the system determines the code samples for which automatic SDK-integration is ideal or could be easily implemented. In some embodiments, automatically integrating an SDK(s) into a code sample comprises automatically identifying the optimal points for SDK integration, and injecting the necessary SDK components (e.g., dynamically) without requiring manual code modifications.

In some embodiments, the system automatically adjusts SDK integration in real-time based on code changes and execution patterns. For example, the system can monitor code within the codebase, identify changes to code samples or call flows, and correspondingly update the SDK integration to ensure proper or optimal integration. Accordingly, various embodiments improve maintainability and reduce the complexity of managing multiple SDKs.

Various embodiments provide a system, method, and device for providing enterprise security based on the use of machine learning models, such as large language models (LLMs). The system analyses the cloud-to-cloud security and ensures that the code is secure to holistically protect the enterprise. The system can identify a call flow within a codebase, determine a corresponding code sample, determine to perform an automatic SDK-injection to the code sample, and query the machine learning model (e.g., the LLM) to inject the SDK in connection with generating (e.g., obtaining) an SDK-injected code sample.

Understanding and managing call flows is crucial in several aspects of software development for the following reasons: (a) debugging and troubleshooting; (b) performance optimization; (c) code quality and maintainability; (d) security analysis; (e) integration and dependency management; (f) documentation and knowledge transfer; and (g) testing and validation.

Identifying the call flows enables the system to have a contextual understanding of the code. For example, knowing the sequence of calls leading to a bug provides insights into the state and conditions of the program at the time of the error, aiding in more effective troubleshooting and optimal integration of SDKs. The system can further use the identified call flows to understand the code structure (e.g., grasp the overall architecture and design of the software), which can be used in connection with maintaining clean and modular code. Additionally, the system can use the identified call flows in connection with refactoring the code (e.g., call flow analysis can reveal tightly coupled or overly complex parts of the code that may benefit from refactoring, improving maintainability and readability).

The system can use the identified call flows in connection with vulnerability detection. For example, the call flows can help in identifying insecure coding practices and potential vulnerabilities, such as unvalidated input or improper resource handling. In addition, the system can use the call flows to analyze access control implemented by the code. For example, the system can use the understanding of the call flows to ensure that sensitive functions are not inadvertently exposed or misused, enhancing the security of the application.

The system uses the identified call flows to enable improved integration of SDKs or libraries, and integration of the corresponding code sample into the broader codebase.

When integrating third-party SDKs or libraries, the system uses the identified call flows to ensure that these components are used correctly and efficiently. The system can further use the call flows to determine a dependency mapping, such as to identify dependencies between different modules and external components, which can allow the system to ensure the dependencies are maintained during SDK-integration, etc.

Interpreting or detecting call flows in software code involves understanding how function calls and data are passed through various parts of the code. This process can be crucial for debugging, performance optimization, and comprehending the overall architecture of a software system. Examples of approaches to interpret or detect call flows in software code include: (a) manual code analysis; (b) call graph generation; (c) dynamic analysis; (d) instrumenting code; (e) implementing integrated development environment (IDS) features; (f) implementing software architecture tools; and (g) implementing reverse engineering tools, such as decompilers and disassemblers.

In some embodiments, the system determines (e.g., identifies) a call flow and corresponding code sample based at least in part on performing an abstract syntax tree (AST) analysis. An AST is a tree representation of the abstract syntactic structure of source code. As an example, each node in the tree denotes a construct occurring in the source code. AST parsing is the process of analyzing source code to construct this tree structure, which can then be used for various purposes such as code analysis, transformation, and compilation.

ASTs provide a structured representation of code that is easier to analyze than raw source code. They enable static analysis tools to inspect code for errors, enforce coding standards, and detect potential vulnerabilities. Further ASTs allow for the manipulation of code structure programmatically, enabling tools like compilers, code formatters, and refactoring tools to transform source code. Some benefits of using AST parsing for a call flow analysis include:

Precision: AST parsing provides a precise representation of the source code, enabling accurate identification of function calls and their relationships.

Static Analysis: Unlike dynamic analysis, AST parsing does not require code execution, making it safer and easier to analyze large codebases or potentially unsafe code.

Tool Integration: Many static analysis tools and IDEs use AST parsing to provide advanced code insights, making it easier to integrate into existing workflows.

In some embodiments, the system identifies the call flows within code (e.g., a codebase in a code repository) based on parsing the source code into an AST, and traversing the AST to identify function definitions and function calls. Additionally, the system can construct a call graph showing which functions call which other functions.

The system can use the AST or identified call flows to determine the set of code samples respectively corresponding to the identified call flows. For example, the system uses the AST to determine a clear function boundary around a particular call flow and deem the code within the clear function boundary as a code sample. Additionally, or alternatively, the system determines the code samples (e.g., the boundaries of code) based at least in part on Kubernetes DNS logs, service definitions, and/or deployment manifests. The system can use machine learning processes to understand the boundaries of applications and criticality of applications or portions thereof.

In some embodiments, the system determines whether to protect the code (e.g., to perform an SDK-injection) based at least in part on one or more identified call flows. The system determines one or more code samples based on the one or more identified call flows. The system can further determine whether to perform an SDK-injection for a particular code sample based at least in part on the call flow or the code sample. In some implementations, the system automatically determines whether to perform the SDK-injection for a particular code sample, such as based at least in part on one or more predefined rules or heuristics. In other implementations, the system determines a set of SDK automatic injection targets that are code samples for which the system determines automatic SDK-injection is ideal or could be implemented. The system can provide an indication of the set of SDK automatic injection targets to a user (e.g., the system provides a list of code samples for which automatic SDK injection is ideal or can be performed) and determines whether to perform the automatic SDK injection based on a user input (e.g., a selection or other indication to perform the automatic SDK injection). As an example, the user is an administrator, a developer, or other domain expert, etc.

According to various embodiments, the automatic SDK-injection can made feasible by first performing a call flow analysis of the code, such as in a manner that does not require machine learning analysis techniques. For example, the analysis of the code may be a pure reachability analysis. The code analysis can help in determining which exact methods and functions or code blocks are involved in invoking language model interactions or any ML model usage where inferencing is performed inside the application. In response to identifying this block(s), the system can implement a deterministic set of heuristics whereby the system knows (e.g., can determine with a high degree of certainty) whether an automated SDK injection can be supported or not. Some of the factors here include things like language support, dynamic dependency injection (e.g. if application code interacting with LLMs are outside the scope of the code under analysis) etc. which may make automated injection impossible. In some embodiments, in response to determining that the application code passes the set of heuristics, the system can implement the automatic SDK-injection.

The system can automatically determine whether to perform the automatic SDK-injection based at least in part on one or more predefined rules or heuristics. Examples of rules that can be implemented include: (a) a determination that automatic SDK-injection is possible, (b) a particular code repository from which the code sample is obtained, (c) a particular project with which the code sample is determined, (d) a call flow structure, (e) a type of call flow, (f) a development language for the code sample, (g) a type of SDK to be injected (e.g., an SDK mandated by an enterprise or to be used to secure the codebase), (h) a dynamic dependency injection, etc. As an example, the system can be configured to perform automatic SDK injection for any code sample (e.g., call flow) stored in a repository owned by a particular development team or for a particular project.

In response to determining that SDK injection (e.g., automatic SDK injection) is to be performed with respect to a particular code sample, the system causes the SDK to be injected to the sample code to obtain an SDK-injected code sample. The system can store the SDK-injected code sample in the codebase, such as to replace the code sample. In some embodiments, the causing the SDK—to be injected to the code sample comprises querying a machine learning (ML) model to inject the SDK and obtain the SDK-injected code sample. For example, the system generates a prompt for querying the ML model, and provides the prompt to the ML model.

According to various embodiments, in response to determining (e.g., identifying) the code block(s) that is most suitable for injection, the system extracts the code content with neighboring code blocks for additional context and then uses a large language model (e.g., queries an LLM) to compose a new code that implements the same behavior as in the code blocks that were identified previously, with the SDK import as a context provided in the prompt. The system (e.g., a database) can maintain an SDK in one of the languages and use 'few shot examples' on how to use it in code with the prompt as a helper. The LLM is then instructed (e.g., prompted) to compose a new version of the code using this context of the SDK and how to use it as provided in the prompt as context. In response to the code being generated (e.g., the SDK-injected code sample), the system implements a syntax validation check using basic grammar of the chosen language to ensure there are no obvious errors. According to various embodiments, the system generates the prompt to the LLM using the 'few shot examples' (e.g., the 'few shot learnings' approach) to provide additional context, including how to add code lines to emit the required info around LLM usage at run time from the application, etc. Because the system has used AST parsing to narrow down to the specific lines of code to make this change (e.g., to identify the block of code to which the SDK is to be injected), the system will be in a position to replace this code with the SDK-injected code sample (e.g., an AI generated code that includes the SDK injection). The system may have access to the code repo for the code under analysis (e.g., Github, etc.) and can create new pull requests. Accordingly, the system can make this change (e.g., the modification of the code with the SDK-injected code sample) on a dedicated git branch on the code repository (e.g., a customer's code repository) and pushed as a new pull request where the code administrator (e.g., code owner, customer, etc.) is notified of the change for manual review/approval. Additional integration testing and build verification may performed as part of this process re-using all of the guardrails set by the code owner/administrator.

In some embodiments, the prompt used to query the ML model is determined based at least in part on the code sample and the SDK. The prompt may request that the ML model (e.g., the LLM) provide a refactored code sample with the injected SDK. For example, the system generates the prompt to comprise the code sample and the code for the SDK to be injected. As another example, the system generates the prompt to comprise the code sample and an indication of the SDK or type/class of SDK to be injected, and the ML model can determine (e.g., obtain) the code for the SDK or type/class of SDK based on the indication. The prompt may additionally comprise an indication of the programming language for one or more of the code sample and the SDK code. Alternatively, the ML model analyzes the code sample and/or the SDK code and detects the corresponding programming language(s).

The ML model injects the SDK code in a manner that would be native to the code sample. For example, the system provides a code snippet (e.g., the code sample), an indication of what is expected to be injected (e.g., the SDK code or indication of the SDK code), and requests that the ML model refactor the code snippet to account for the injection of the SDK. In response, the ML model takes into account the existing logic of the code sample and/or SDK when injecting the SDK and generating the SDK-injected code sample.

In some embodiments, the machine learning model is a large language model (LLM). The LLM implemented to inject the SDK can be selected based on the code sample and/or SDK to be injected. For example, certain LLMs are better suited to interpreting and writing code. Further, some LLMs are more ideal (e.g., better trained to write code) for certain software development languages. Examples of LLMs that can be implemented include, without limitation, Llama3, Azure OpenAI, Vertex, etc. However, various other LLMs may be implemented.

In response to obtaining the SDK-injected code sample (e.g., the refactored code sample with the injected SDK), the system can store the SDK-injected code sample, such as in the codebase as a replacement for the code sample (e.g., the sample without the SDK injected thereto). In some embodiments, before storing the SDK-injected, the system performs a post-processing of the SDK-injected code. For example, the post-processing includes performing a validation or vetting of the SDK-injected code. The validating or vetting of the SDK-injected code sample includes determining whether the SDK-injected code operates normally (or as intended), determining whether the SDK-injected code is subject to a known vulnerability or type of vulnerability, etc. The post-processing (e.g., the validating or vetting of the SDK-injected code) can be performed based on a static analysis. In response to determine that the SDK-injected code sample is successfully validated or vetted, the system stores the SDK-injected code sample to the repository (e.g., into the codebase, such as a replacement for the original code snippet that has been refactored by the ML model).

According to various embodiments, the system dynamically adapts to changes in the codebase and intelligently injects SDKs based on real-time analysis of call flows or intelligently updates an SDK-integration based on changes to code associated with a particular call flow (or updated call flow).

FIG. 1 is a block diagram of an environment for providing a security service according to various embodiments. In some embodiments, system 100 implements at least in part of system 200 of FIG. 2 and/or system 300 of FIG. 3. System 100 can implement at least part of one or more of processes 500-1300 of FIGS. 5-13.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains, DNS hijacked domains, or stockpiled domains, or such as traffic for certain applications (e.g., SaaS applications). In some embodiments, data appliance 102 is also configured to enforce policies with respect to traffic that stays within (or from coming into) enterprise network 110.

In some embodiments, data appliance 102 is a security entity, such as a firewall (e.g., an application firewall, a next generation firewall, etc.). An enterprise network (e.g., a network for a tenant serviced by security platform 140) may comprise a set of data appliances 102 (e.g., a set of remote network nodes).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including securing code within a codebase (e.g., a code repository), automatically injecting an SDK into certain code snippets (e.g., code samples) for the codebase, or various other security services for network traffic, such as real-time or contemporaneous classifications, or offline classifications. The various other security services may include classifying domains (e.g., predicting whether a domain is a DNS hijacked domain, etc.), classifying network traffic, providing a mapping of signatures to certain domains (e.g., domains for which a predicted likelihood that the domain is a DNS hijacked domain exceeds a predefined likelihood threshold, etc. a mapping of domains to domain data (e.g., domain certificates, pDNS data, active DNS data, WHOIS data, etc.), performing static and dynamic analysis on malware samples, monitoring new domains (e.g., detecting new domains for which a certificate is issued/generated), assessing maliciousness of domains, determining whether a domain associated with a traffic sample is (or is likely to be) a DNS hijacked domain, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain, a DNS hijacked domain) or benign (e.g., an unparked domain), providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, or domains are malicious, providing an indication that an input string, file, or domain is malicious (or benign), simulating DNS hijacking attacks/campaigns (e.g., generating synthetic DNS hijacking records), and training classifiers (e.g., training machine learning models, such as to be used to provide inline detection of DNS hijacked domains, or offline detection of DNS hijacked domains).

In some embodiments, security platform 140 is deployed as a cloud service. For example, security platform 140 may be implemented by one or more servers and may comprise one or more clusters of worker nodes (e.g., virtual machines).

In some embodiments, security platform 140 classifies the network traffic, files, or domains in response to receiving a network traffic sample or according to a predefined schedule. For example, security platform 140 can perform the classification as the endpoint or network entity (e.g., a firewall or data appliance 102) detects traffic for a new domain, traffic to/from a suspicious domain, a new file, etc. In various embodiments, results of analysis (and additional information pertaining to applications, domains, etc.), such as an analysis or classification performed by security platform 140, are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remaining portions of security platform 140 provided by dedicated hardware owned by and under the control of the operator of security platform 140.

In the example shown, security platform 140 comprises malicious traffic detector 138. Malicious traffic detector can classify network traffic in real-time (e.g., contemporaneous with a firewall, such as data appliance 10,2 receiving such traffic) or offline (e.g., to generate whitelists or blacklists, etc.). As illustrated, malicious traffic detector 138 can comprise a DNS tunneling detector, a malicious file detector, or a malicious domain detector (e.g., to predict whether a domain is malicious or hijacked, etc.). Malicious traffic detector 138 may implement one or more classifiers, such as machine learning models, to predict the classifications. Additionally, malicious traffic detector 138 may train the machine learning model(s) to perform the classifications. According to various embodiments, security platform 140 may perform various other security services.

Security platform 140 comprises code security service 170. Code security service 170 can ensure that code in a codebase or otherwise stored in a repository (e.g., a repository associated with a particular tenant or customer) is secure. As shown, code security service 170 can comprise a call flow detector, a code fix engine, and a machine learning model.

Code security service 170 can secure a codebase continuously, periodically (e.g., according to a predefined schedule/frequency), upon receipt of a user input, or in response to determining one or more predefined criteria is satisfied. As an example, code security service 170 can detect that the codebase has been modified/updated, and in response to such a detection code security service 170 can enforce security, such as by automatically injecting SDKs into code samples of the codebase.

Code security service 170 uses the call flow detector to obtain code (e.g., a codebase) from a repository, such as database 160, parse the code, and identify the call flows comprised in the code. As an example, the call flow detector uses an AST technique to parse the code and identify a set of call flows. In response to identifying the set of calls, code security service 170 (e.g., the call flow detector) can determine a set of code samples comprised in the code (e.g., the codebase). A code sample can be determined based on a determination of the boundaries of corresponding call flow.

In response to determining the set of code samples, code security service 170 determines whether one or more of the set of code samples are targets (e.g., potential code samples) for an automatic SDK-injection (such targets may also be referred to herein as SDK automatic injection targets). The determination of whether one or more of the set of code samples are targets can be based at least in part on one or more predefined rules or a manual review (e.g., by a domain expert such as a developer). The one or more predefined rules may be based on one or more of: (a) the code is associated with a particular repository, (b) the code is associated with a particular tenant, (c) the code is associated with a particular project (e.g. which may be defined by a developer or tenant administrator) is to be subject to automatic SDK injection, (d) the call flow for a code sample corresponds to a particular call flow or call flow type/class, (e) the code sample is written in a particular language or type/class of language, (f) the call flow for a code sample comprises a particular function (e.g., the call flow includes performing a cloud-to-cloud communication), (g) the call flow for a code sample comprises an accessing or processing of sensitive information (e.g., personal identifiable information, health data, confidential information, trade secrets, financial data, etc.), etc.

In response to determining that the set of SDK automatic injection targets, code security service 170 can cause a particular SDK (or type of SDK) to be injected. Code security service 170 can automatically invoke the SDK injection or based on a user input. For example, code security service 170 may provide information pertaining to the set of SDK automatic injection targets to a user such as an administrator (e.g., a domain expert, a developer, etc.) and the user may select those code samples (e.g., targets) for which automatic SDK injection is to be performed. In response to determining to cause the particular SDK code to be injected, code security service 170 causes the code fix engine to automatically inject the SDK to obtain a corresponding SDK-injected code sample.

The code fix engine can use an ML model in connection with automatically injecting the SDK. For example, the code fix engine implements an LLM to generate the SDK-injected code sample corresponding to the particular SDK automatic injection target with the particular SDK injected therein. In connection with obtaining the SDK-injected code sample, the code fix engine generate a prompt to provide to the LLM to inject the SDK to the code sample and generate the SDK-injected code sample. The prompt can be determined based at least in part on the code sample and the SDK (or type of SDK) to be injected. The prompt may be additionally determined based at least in part on a language of the code sample. For example, the code fix engine can generate the prompt to comprise the code sample, the code for the SDK, and an indication of the language in which the code sample is written, etc.

Code security service 170 may optionally comprise an ML model such as an LLM that is prompted/queried to generate the SDK-injected code sample. Alternatively, the ML model may be hosted by another system or service (e.g., a third party service) and code security service 170 may generate the prompt or query, and send the query to the hosted ML model.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

As an illustrative example, the environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious domains, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding domain (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. In other implementations, an inline security entity queries a mapping of hashes/signatures to traffic classifications (e.g., indications that the traffic is C2 traffic, indications that the traffic is malicious traffic, indications that the traffic is benign/non-malicious, etc.). This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may use a machine learning model to detect/predict whether the file is malicious) whether the queried file is a malicious file (or likely to be a malicious file) and provide a result back to data appliance 102 (e.g., "malicious file" or "benign file").

In some embodiments, security platform 140 comprises a network traffic classifier that provides to a security entity, such as data appliance 102, an indication of the traffic classification. For example, in response to detecting the C2 traffic, network traffic classifier sends an indication that the domain traffic corresponds to C2 traffic to data appliance 102, and the data appliance 102 may in turn enforce one or more policies (e.g., security policies) based at least in part on the indication. The one or more security policies may include isolating/quarantining the content (e.g., webpage content) for the domain, blocking access to the domain (e.g., blocking traffic for the domain), isolating/deleting the domain access request for the domain, ensuring that the domain is not resolved, alerting or prompting the user of the client device the maliciousness of the domain prior to the user viewing the webpage, blocking traffic to or from a particular node (e.g., a compromised device, such as a device that serves as a beacon in C2 communications), etc. As another example, in response to determining the application for the domain, the network traffic classifier provides to the security entity with an update of a mapping of signatures to applications (e.g., application identifiers).

Figure 2:
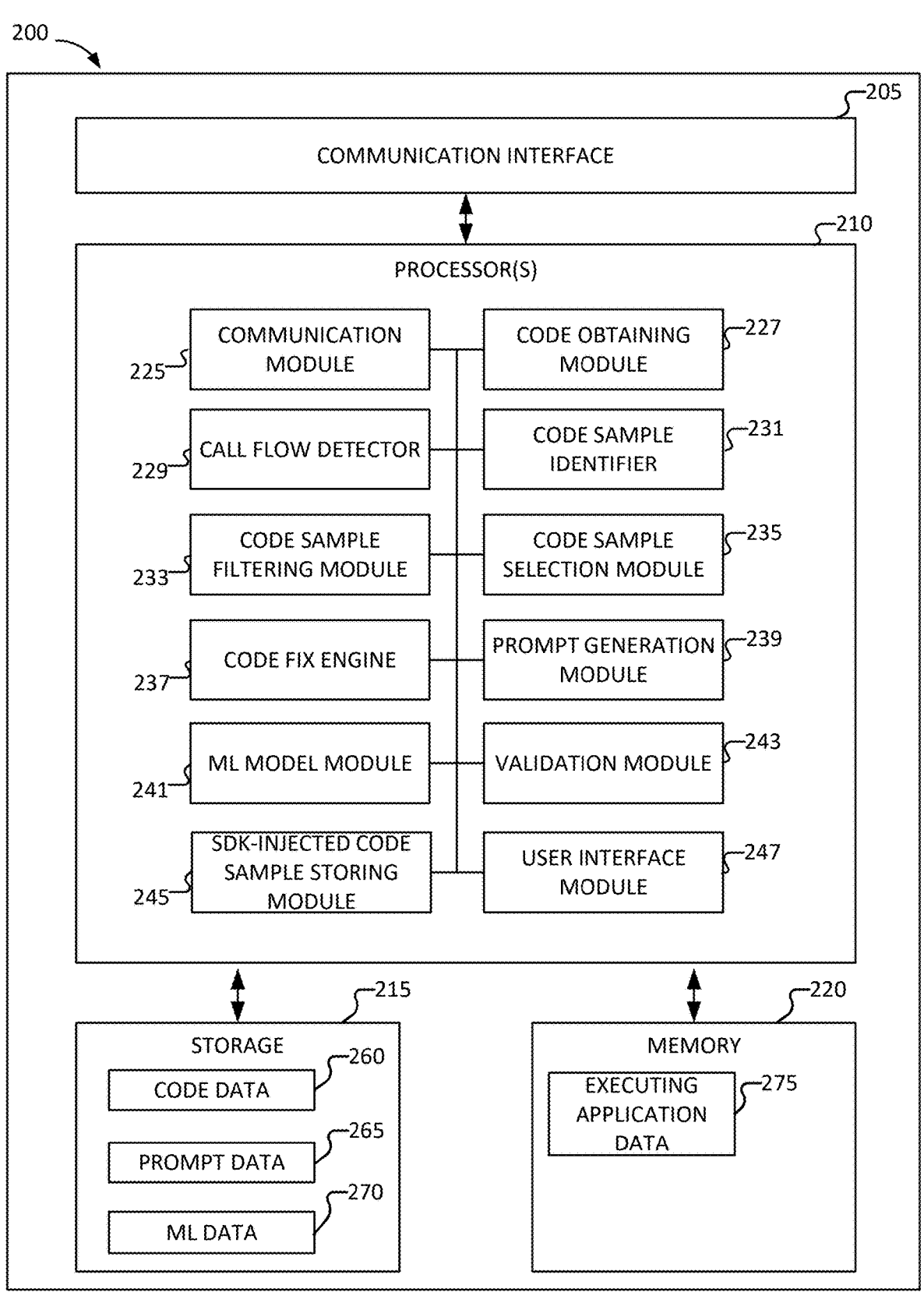
FIG. 2 is a block diagram of a system to securing code samples according to various embodiments.

FIG. 2 is a block diagram of a system to securing code samples according to various embodiments. In some embodiments, system 200 implements at least in part of system 100 of FIG. 1 and/or system 300 of FIG. 3. System 200 can implement at least part of one or more of processes 500-1300 of FIGS. 5-13.

System 200 can be implemented by one or more devices such as servers. System 200 can be implemented at various locations on a network. In some embodiments, system 200 implements a system for communicating traffic between a data appliance such as a security entity (e.g., data appliance 102) and security platform 140 of FIG. 1. As an example, system 200 is deployed as a service to ensure that code developed in a codebase (e.g., a repository for a tenant) is secure, such as by enforcing SDK injection in connection with certain call flows.

In the example shown, system 200 implements one or more modules in connection with ensuring that a connection is maintained through the failover or switchover of an active network node to a standby network node, etc. System 200 comprises communication interface 205, one or more processors 210, storage 215, and/or memory 220. One or more processors 210 comprises one or more of communication module 225, code obtaining module 227, call flow detector 229, code sample identifier 231, code sample filtering module 233, code sample selection module 235, code fix engine 237, prompt generation module 239, ML model module 241, validation module 243, SDK-injected code sample storing module 245, and user interface module 247.

In some embodiments, system 200 comprises communication module 225. System 200 uses communication module 225 to communicate with various nodes or end points (e.g., client terminals, firewalls, DNS resolvers, data appliances, other security entities, cloud services, code repositories, upstream services, worker nodes, etc.), and/or third-party services. For example, communication module 225 provides to communication interface 205 information that is to be communicated (e.g., to a code repository, a third party service hosting a machine learning model or LLM, etc.).

In some embodiments, system 200 comprises code obtaining module 227. System uses code obtaining module 227 to obtain code from a codebase, such as a codebase stored in a code repository. The code repository may be a third party service, such as GitHub or other cloud storage service.

In some embodiments, system 200 comprises call flow detector 229. System uses call flow detector 229 to parse the obtained code and detect call flows within the code. For example, call flow detector 229 parses the code using an AST technique and identifies a set of call flows within the code based on the AST.

In some embodiments, system 200 comprises code sample identifier 231. System uses code sample identifier 231 to determine a set of code samples based at least in part on the set of call flows. The set of code samples can be determined based on the AST. For example, code sample identifier 231 can segment the code into the set of code samples based on determining the functional boundaries for the identified set of call flows.

In some embodiments, system 200 comprises code sample filtering module 233. System uses code sample filtering module 233 to filter the set of code samples pertaining to the identified call flows to obtain a set of SDK automatic injection targets to which system 200 is to automatically inject a particular SDK(s). Code sample filtering module 233 can filter the set of code samples based at least in part on one or more predefined rules or based on use input.

In some embodiments, system 200 comprises code sample selection module 235. System uses code sample selection module 235 to select from the set of SDK automatic injection targets a particular code sample(s) to be processed to perform automatic SDK injection. The code sample selection module 235 can select the particular code sample(s) based at least in part one or more predefined rules (e.g., a call flow having a high criticality or a criticality exceeding a predefined threshold) or user input.

In some embodiments, system 200 comprises code fix engine 237. System uses code fix engine 237 to obtain an SDK-injected code sample corresponding to the particular code sample processed to inject the particular SDK. Code fix engine 237 can obtain the SDK-injected code sample based at least in part on querying a ML model, such as ML model module 241. In connection with querying the ML model, code fix engine 330 invokes prompt generation module 239 to generate a prompt to be used to query the ML model. The prompt may be generated based at least in part on the code sample (e.g., a code snippet for the code sample) and the SDK (e.g., the code for the SDK).

In response to generating the prompt, code fix engine 237 queries the ML model (e.g., an LLM) based at least in part on the prompt. For example, code fix engine 237 provides the prompt to ML model module 241 to query the ML model. ML model module 241 may comprise the ML model, or may be an interface with which system 200 queries a third party ML model. Code fix engine 330 obtains the SDK-injected code sample from ML model module 241.

In some embodiments, system 200 comprises validation module 243. System uses validation module 243 to validate or vet the SDK-injected code sample. For example, system 200 uses validation module 243 validates that the SDK-injected code sample operates normally (e.g., functions as intended), will compile, free of exposures to vulnerabilities, etc.

In some embodiments, system 200 comprises SDK-injected code sample storing module 245. System uses SDK-injected code sample storing module 245 to store the SDK-injected code into the codebase in response to determining that the SDK-injected sample code has been successfully validated.

In some embodiments, system 200 comprises user interface module 247. System 200 uses user interface module 247 to configure and provide a user interface to a user, such as to a client system used by an administrator. User interface module 247 configures a user interface to provide the notifications or alerts, such as alerting the user of SDK automatic injection targets, an identified vulnerability, a completion of securing a codebase, etc.

According to various embodiments, storage 215 comprises one or more of code data 260, prompt data 265, and ML data 270. Storage 215 comprises a shared storage (e.g., a network storage system) and/or database data, and/or user activity data. Code data 260 can store one or more of code obtained from a codebase, information obtained by parsing the code, information pertaining to a set of call flows for the code, and information pertaining to a set of SDK automatic injection targets, etc. Prompt data 265 stores information pertaining to prompts generated by prompt generation module 239 and used to query an ML model. ML data 270 stores information pertaining to one or more ML models, such as a set of LLMs, a mapping of programming languages to LLMs (e.g., LLMs that are well suited for processing code snippets in that mapped programming language), etc.

According to various embodiments, memory 220 comprises executing application data 275. Executing application data 275 comprises data obtained or used in connection with executing an application such as an application executing an AST parsing technique, an application to identify call flows (e.g., based on an AST), an application to identify code samples based on a set of call flows, etc. Other applications comprise any other appropriate applications (e.g., a communications application, a machine learning model application, an application for detecting suspicious or DNS hijacked domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 3:
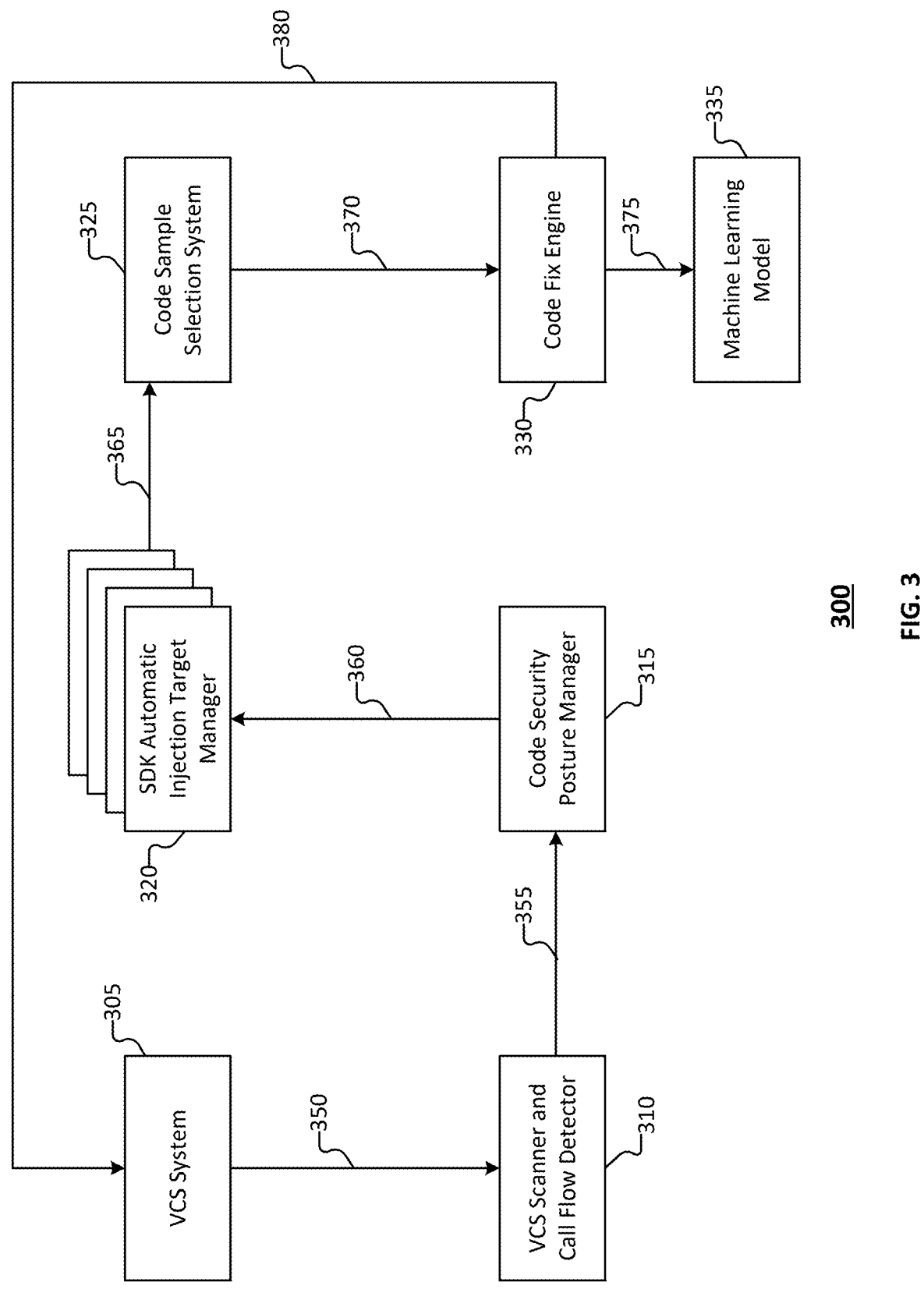
FIG. 3 is a block diagram of a system to securing code samples according to various embodiments.

FIG. 3 is a block diagram of a system to securing code samples according to various embodiments. In some embodiments, system 300 implements at least in part of system 100 of FIG. 1 and/or system 200 of FIG. 2. System 300 can implement at least part of one or more of processes 500-1300 of FIGS. 5-13.

According to various embodiments, system 300 comprises one or more of VCS system 305, VSC scanner and call flow detector 310, code security posture manager 315, SDK automatic injection targets manager 320, code sample selection system 325, code fix engine 330, and machine learning (ML) model 335.

System 300 uses VCS system 305 to provide a version control service with respect to a codebase. VCS system 305 may comprise a repository in which a codebase is stored. The repository and/or codebase may be associated with a particular tenant or a particular development project. In some embodiments, VCS system 305 stores codebases for a plurality of tenants and/or a plurality of projects. For example, VCS system 305 is a tenanted cloud storage that allows customers to develop code.

At 350, VCS scanner and call flow detector 310 obtains data (e.g., code) from the codebase stored at VCS system 305. VCS scanner and call flow detector 310 can periodically obtain the code from the codebase or obtain the code upon receipt of a user input or a predefined criteria being satisfied, such as the VCS system 305 providing an indication that the codebase has been updated/modified. In response to obtaining the code, VCS scanner and call flow detector 310 parses the code to identify a set of call flows comprised in the code.

In some embodiments, VCS scanner and call flow detector 310 implements an AST technique to parse the code and identify the set of call flows comprised in the obtained code.

In some embodiments, VCS scanner and call flow detector 310 can additionally scan the code for vulnerabilities and SBOMs. In response to detecting a vulnerability, VCS scanner and call flow detector 310 can provide the code to a service to remediate the vulnerability or to provide an alert to a user (e.g., a developer, codebase owner, or administrator, etc.) that a vulnerability has been detected. In response to identifying the set of call flows comprised in the code, VCS scanner and call flow detector 310 can determine a corresponding set of code samples. For example, VCS scanner and call flow detector 310 segments the obtained code into the set of code samples based at least in part on the boundaries of the identified call flows. At 355, in response to determining the set of code samples, VCS scanner and call flow detector 310 provides (e.g., pushes) the set of code sample to code security posture manager 315.

VCS scanner and call flow detector 310 can be optionally enhanced/optimized to identify call flows (and corresponding code samples) that can be used as use cases for automatic SDK injection by a ML model (e.g., an LLM).

System 300 uses code security posture manager 315 to analyze the set of code samples and/or corresponding set of call flows, and identify a set of SDK automatic injection targets. Code security posture manager 315 can identify the set of SDK automatic injection targets based at least in part on one or more predefined rules (e.g., static rules) or heuristics.

In some embodiments, machine learning models (e.g., LLMs) cannot scale to provide an automated SDK injection for each code sample in a codebase. For example, system 300 may store codebases for thousands of customers (e.g., tenants), and each customer may have tens of repositories respectively storing codebases with numerous call flows. In the case that the ML model used to automatically inject SDKs to the code samples is an LLM, prompting the LLM is relatively computationally expensive, thus making scaling the use of the LLM for automatic SDK injection for all call flows infeasible. Accordingly, system 300 implements a filtering technique to filer the set of code samples to obtain the set of SDK automatic injection targets. For example, system 300 uses code security posture manager 315 to filter the set of code samples to identify flows or repositories where LLM security can be enabled (e.g., targets for which an LLM can be used to automatically inject the SDK into the code without manual configuration/development).

The one or more predefined rules may be based on one or more of: (a) the code is associated with a particular repository, (b) the code is associated with a particular tenant, (c) the code is associated with a particular project (e.g. which may be defined by a developer or tenant administrator) is to be subject to automatic SDK injection, (d) the call flow for a code sample corresponds to a particular call flow or call flow type/class, (e) the code sample is written in a particular language or type/class of language, (f) the call flow for a code sample comprises a particular function (e.g., the call flow includes performing a cloud-to-cloud communication), (g) the call flow for a code sample comprises an accessing or processing of sensitive information (e.g., personal identifiable information, health data, confidential information, trade secrets, financial data, etc.), (h) the codebase or repository has been set to public (e.g., the repository is set to be public in GitHub or other code repository service), (i) a criticality of the codebase or associated product (e.g., a deemed criticality, such as based on the analysis of the call flows within the code), etc.

At 360, in response to determining the set of SDK automatic injection targets, code security posture manager can provide (e.g., push) the set of SDK automatic injection targets (or indications of the set of SDK automatic injection targets) to SDK automatic injection targets manager 320. SDK automatic injection targets manager 320 stores the set of SDK automatic injection targets or a list of the code samples comprised in the set of SDK automatic injection targets.

At 365, system 300 uses code sample selection system 325 to identify those code samples or repositories in the set of SDK automatic injection targets for which automatic SDK injection is to be performed. For example, code sample selection sample 325 identifies the call flows or repositories where LLM security can be enabled. The code samples for which automatic SDK injection is to be performed can be selected manually (e.g., by a user such as a repository administrator) or automatically (e.g., by the code sample selection sample 325 based on a set of rules or heuristics).

In some embodiments, SDK automatic injection targets manager 320 or code sample selection sample 325 provides an indication of one or more of the set of SDK automatic injection targets to another system, such as a client system associated with a user (e.g., an administrator, a domain expert, etc.). The user can analyze the provided SDK automatic injection targets and provide an input selecting those SDK automatic injection targets for which automatic SDK injection is to be implemented.

In some embodiments, SDK automatic injection targets manager 320 or code sample selection system 325 automatically determines one or more of the set of SDK automatic injection targets for which system 300 is to use an ML model to automatically generate an SDK-injected code sample. Code sample selection sample 325 can use the context for the codebase or associated product/project, or a criticality of the associated call flows to automatically select those code samples for which automatic SDK injection is to be performed. Code sample selection sample 325 can cause all SDK automatic injection targets to be processed to have the SDK automatically injected. As an example, code sample selection sample 325 prioritizes the SDK automatic injection targets and system 300 causes automatic SDK injection to be performed for the set of SDK automatic injection targets according to the priority. Alternatively, code sample selection sample 325 can filter the set of SDK automatic injection targets to identify those code samples for which automatic SDK injection is to be performed. As an example, the filtering can be performed based on one or more predefined rules or heuristics.

At 370, code sample selection system 325 can provide to code fix engine 330 the code sample(s) for which an SDK is to be automatically injected, or an indication of the code sample(s).

System 300 uses code fix engine 330 to automatically inject the SDK to the selected code samples. For example, code fix engine 330 coordinates the automatic injection such as by querying machine learning model 335 to generate an SDK-injected code sample. Code fix engine 330 determines a prompt to be used to query machine learning model 335, such as based at least in part on the code sample and the SDK to be injected. Machine learning model 335 can generate the SDK-injected code sample based on determining (e.g., inferring) the language in which the code sample is written and/or the code for the SDK. In some embodiments, the prompt is generated to comprise the code sample (e.g., the corresponding code snippet), code for the SDK (or alternatively, an indication of the particular SDK to be implemented), and an indication of the language for the code sample and/or code for the SDK.

At 375, in response to determining the prompt, code fix engine 330 queries machine learning model 335 to generate the SDK-injected code sample. Machine learning model 335 may be a third party service that system 300 can query. In some embodiments, machine learning model 335 comprises an LLM that is configured to process the prompt provided by code fix engine 330 and generate the SDK-injected code sample. Some LLMs are very capable of translating between languages. As such, system 300 implements an LLM that has this capability of translating between language or that is deemed to be ideal or sufficient (e.g., having an accuracy exceeding a predefined accuracy threshold) for generating an SDK-injected code sample in a particular language such as the language of the code sample for which the SDK is to be automatically injected.

In some embodiments, system 300 stores a set of SDKs from which system 300 (e.g., code fix engine 330) can select a particular SDK for automatic injection for a particular code sample or a particular codebase associated with a set of code samples. The SDK to be injected to the code sample may be a lightweight SDK that serves as a logic or wrapper of a simple function that causes the system running the application (e.g., the application that uses the code sample) to authenticate itself with a cloud service and offload a processing of data to the cloud service upon authentication.

In response to obtaining the SDK-injected code sample, code fix engine 330 (or another service within system 300) performs a validation and/or vetting of the SDK-injected code sample. The validation and/or vetting may be performed based on a static analysis of the-injected code sample. As an example, system 300 validates that the SDK-injected code sample will be functional (e.g., that the SDK-injected code sample will function as intended), etc. If system 300 (e.g., code fix engine 330) determines that the SDK-injected code sample is validated, system 300 can store the SDK-injected code sample in the codebase or corresponding repository, such as VCS system 305. For example, the SDK-injected code sample is merged into the codebase. If system 300 determines that the SDK-injected code sample is validated, system 300 may discard the SDK-injected code sample. Alternatively, system 300 may provide the SDK-injected code sample back to the machine learning model 335 to rewrite/update the SDK-injected code sample. As another alternative, system 300 may regenerate the prompt and re-query the machine learning model 335 for an SDK-injected code sample for the particular code sample.

FIG. 4A is an example of a code sample. In the example shown, code sample 400 is obtained. The system may determine to inject an SDK. For example, the system may determine to perform an automatic SDK injection, such as by querying an LLM to modify the code sample to generate an SDK-injected code sample (e.g., SDK-injected code sample 450).

FIG. 4B is an example of an SDK-injected code sample according to various embodiments. In the example shown, SDK-injected code sample 450 is generated automatically by the system. SDK-injected code sample 450 comprises the call flow of code sample 400 with the SDK injected therein.

In some implementations, one or more of processes 500-1300 may be implemented by one or more servers, such as in connection with providing a service to a network or a tenant. For example, processes 500-1300 are implemented by one or more servers that provide a security platform (e.g., a cloud service) such as to provide code security (e.g., to secure against code vulnerabilities for cloud-to-cloud services/communications), traffic classifications, malicious file or traffic detections, etc.

Figure 5:
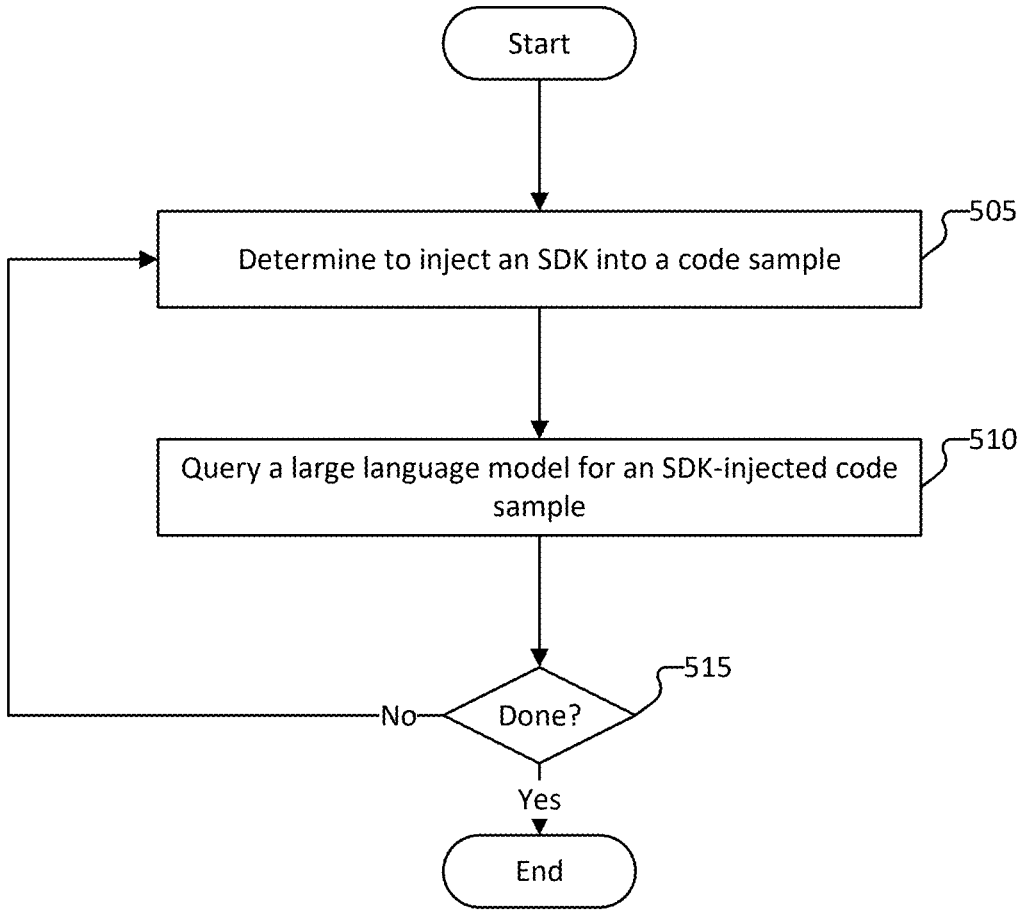
FIG. 5 is a flow diagram of a method for securing a code sample according to various embodiments.

FIG. 5 is a flow diagram of a method for securing a code sample according to various embodiments. In some embodiments, process 500 is implemented at least in part by system 100 of FIG. 1, system 200 of FIG. 2, and/or system 300 of FIG. 3. Process 500 may be implemented by an upstream device such as a worker node, a virtual machine, etc.

At 505, the system determines to inject an SDK into a code sample. At 510, the system queries a large language model (LLM) for an SDK-injected code sample. At 515, a determination is made as to whether process 500 is complete. In some embodiments, process 500 is determined to be complete in response to a determination that no further SDK-injected code samples are to be obtained, no further call flows are to be processed, a codebase has been secured, a set SDK automatic injection targets have been processed/secured, an administrator indicates that process 500 is to be paused or stopped, etc. In response to a determination that process 500 is complete, process 500 ends. In response to a determination that process 500 is not complete, process 500 returns to 505.

Figure 6:
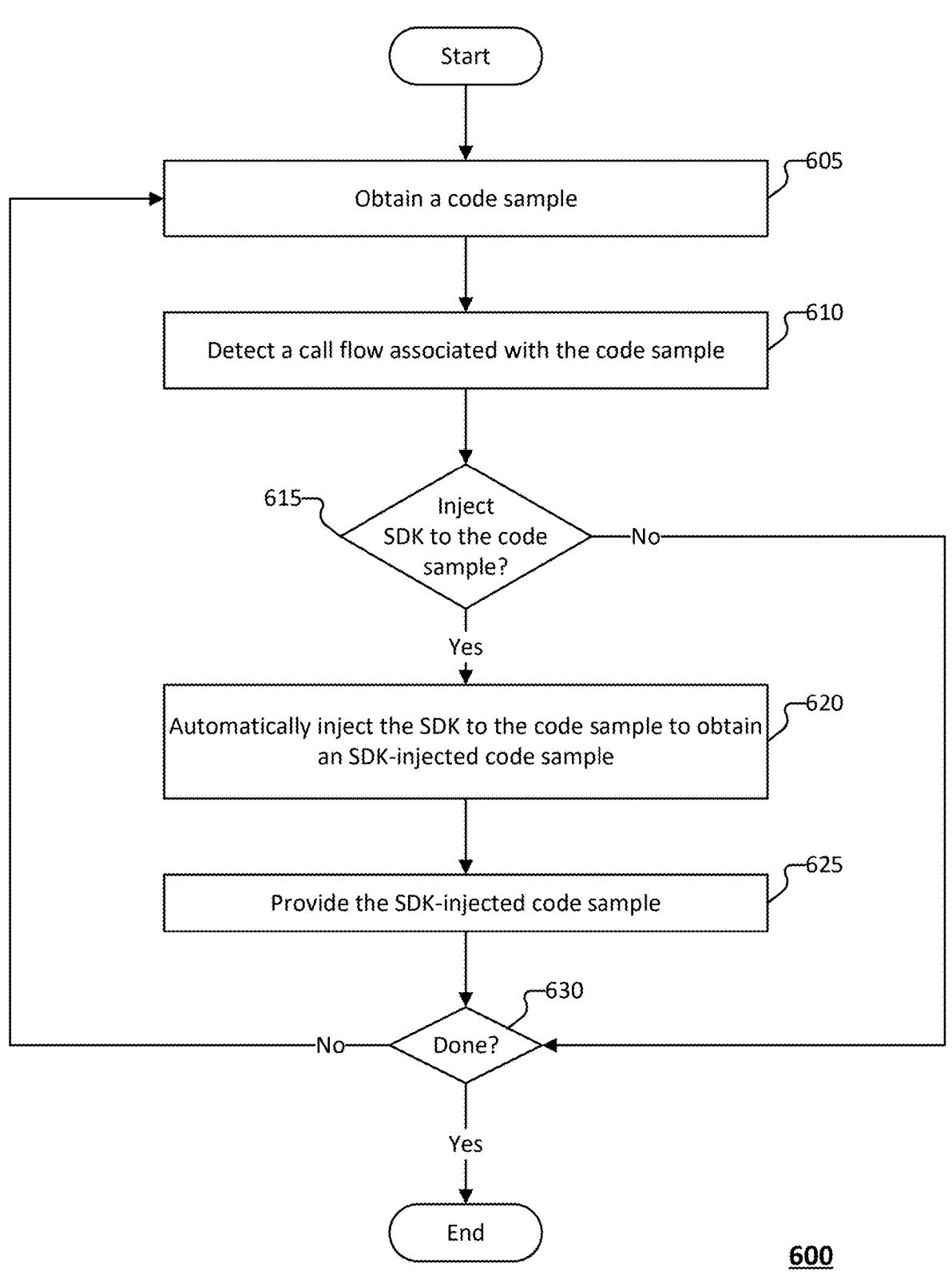
FIG. 6 is a flow diagram of a method for obtaining an SDK-injected code sample according to various embodiments.

FIG. 6 is a flow diagram of a method for obtaining an SDK-injected code sample according to various embodiments. In some embodiments, process 600 is implemented at least in part by system 100 of FIG. 1, system 200 of FIG. 2, and/or system 300 of FIG. 3. Process 600 may be implemented by an upstream device such as a worker node, a virtual machine, etc.

At 605, the system obtains a code sample. At 610, the system detects a call flow associated with the code sample. At 615, the system determines whether to perform an SDK injection with respect to the code sample (e.g., to inject an SDK to the code sample). In response to determining not to perform the SDK injection with respect to the code sample, process 600 proceeds to 630. Conversely, in response to determining to perform the SDK injection with respect to the code sample, process 600 proceeds to 620 at which the system automatically injects the SDK to the code sample to obtain an SDK-injected code sample. At 625, the system provides the SDK-injected code sample. At 630, a determination is made as to whether process 600 is complete. In some embodiments, process 600 is determined to be complete in response to a determination that no further SDK-injected code samples are to be obtained, no further call flows are to be processed, a codebase has been secured, a set SDK automatic injection targets have been processed/secured, an administrator indicates that process 600 is to be paused or stopped, etc. In response to a determination that process 600 is complete, process 600 ends. In response to a determination that process 600 is not complete, process 600 returns to 605.

Figure 7:
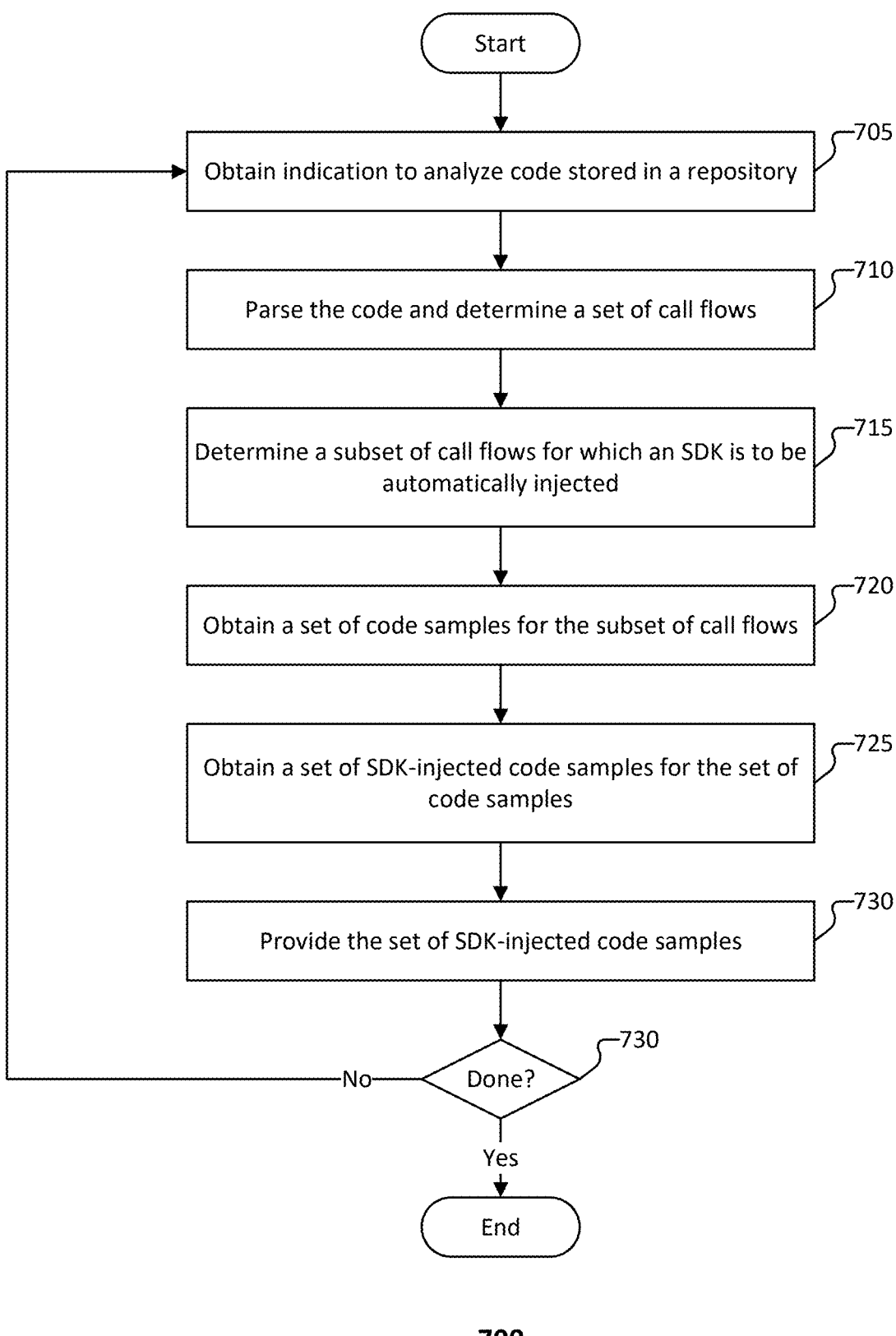
FIG. 7 is a flow diagram of a method for obtaining an SDK-injected code sample according to various embodiments.

FIG. 7 is a flow diagram of a method for obtaining an SDK-injected code sample according to various embodiments. In some embodiments, process 700 is implemented at least in part by system 100 of FIG. 1, system 200 of FIG. 2, and/or system 300 of FIG. 3. Process 700 may be implemented by an upstream device such as a worker node, a virtual machine, etc.

At 705, the system obtains an indication to analyze code stored in a repository. The indication may be received in connection with a security platform providing a service to secure code within a repository. For example, a user may request that the security platform analyze and identify code samples for which injection of an SDK is recommended (e.g., code samples to which SDKs should be injected, such as code samples that are identified to have a certain vulnerability or type of vulnerability, etc.). At 710, the system parses the code and determines a set of call flows for the code. As an illustrative example, the system can implement an AST analysis to identify the call flows within the code. At 715, the system determines a subset of call flows for which an SDK is to be automatically injected. At 720, the system obtains a set of code samples for the subset of call flows. For example, the system can determine the boundaries of certain call flows or otherwise segment the code into a set of code samples based on the identified call flows. At 725, the system obtains a set of SDK-injected code samples for the set of code samples. For example, the system queries an LLM to generate SDK-injected code samples based at least in part on the code samples. The system may prompt the LLM based at least in part on the code sample and the SDK to be injected (or an identifier for the SDK to be injected). In some embodiments, the LLM detects the software development language associated with the code sample and refactors the code sample and the SDK to obtain the SDK-injected code sample. For example, the LLM modifies the code sample in a manner to inject the SDK, which may be written in a different software development language, into the code sample so that the SDK-injected code sample maintains the appropriate context of the code sample (e.g., so the code sample can be used with the intended system or project). At 730, the system provides the set of SDK-injected code samples. At 730, a determination is made as to whether process 700 is complete. In some embodiments, process 700 is determined to be complete in response to a determination that no further SDK-injected code samples are to be obtained, no further call flows are to be processed, a codebase has been secured, a set SDK automatic injection targets have been processed/secured, an administrator indicates that process 700 is to be paused or stopped, etc. In response to a determination that process 700 is complete, process 700 ends. In response to a determination that process 700 is not complete, process 700 returns to 705.

Figure 8:
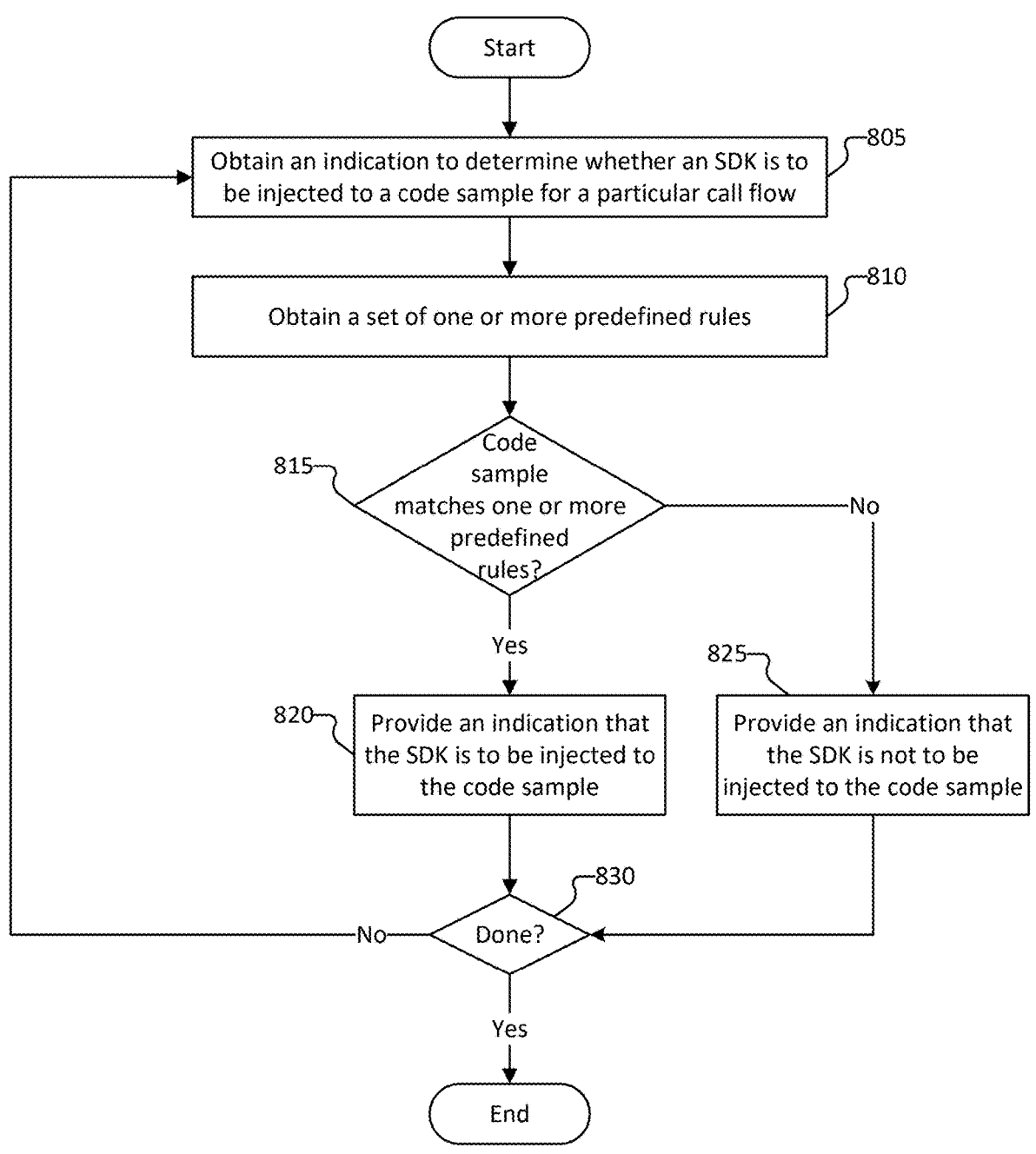
FIG. 8 is a flow diagram of a method for determining whether to inject an SDK sample according to various embodiments.

FIG. 8 is a flow diagram of a method for determining whether to inject an SDK sample according to various embodiments. In some embodiments, process 800 is implemented at least in part by system 100 of FIG. 1, system 200 of FIG. 2, and/or system 300 of FIG. 3. Process 800 may be implemented by an upstream device such as a worker node, a virtual machine, etc. Process 800 may be invoked by process 500 or 600 (e.g., at 615 of process 600).

At 805, the system obtains an indication to determine whether an SDK is to be injected to a code sample for a particular call flow. At 810, the system obtains a set of one or more predefined rules or heuristics. At 815, the system determines whether the code sample matches one or more predefined rules. In response to determining that the code sample matches the one or more predefined rules, process 800 proceeds to 820 at which the system provides an indication that the SDK is to be injected to the code sample. Conversely, in response to determining that the code sample does not match one or more predefined rules, process 800 proceeds to 825 at which the system provides an indication that the SDK is not to be injected to the code sample. The system can provide the indication(s) to another system, service, or process that invoked process 800, such as to 615 of process 600. At 830, a determination is made as to whether process 800 is complete. In some embodiments, process 800 is determined to be complete in response to a determination that no further SDK-injected code samples are to be obtained, no further call flows are to be processed, a codebase has been secured, a set SDK automatic injection targets have been processed/secured, an administrator indicates that process 800 is to be paused or stopped, etc. In response to a determination that process 800 is complete, process 800 ends. In response to a determination that process 800 is not complete, process 800 returns to 805.

Figure 9:
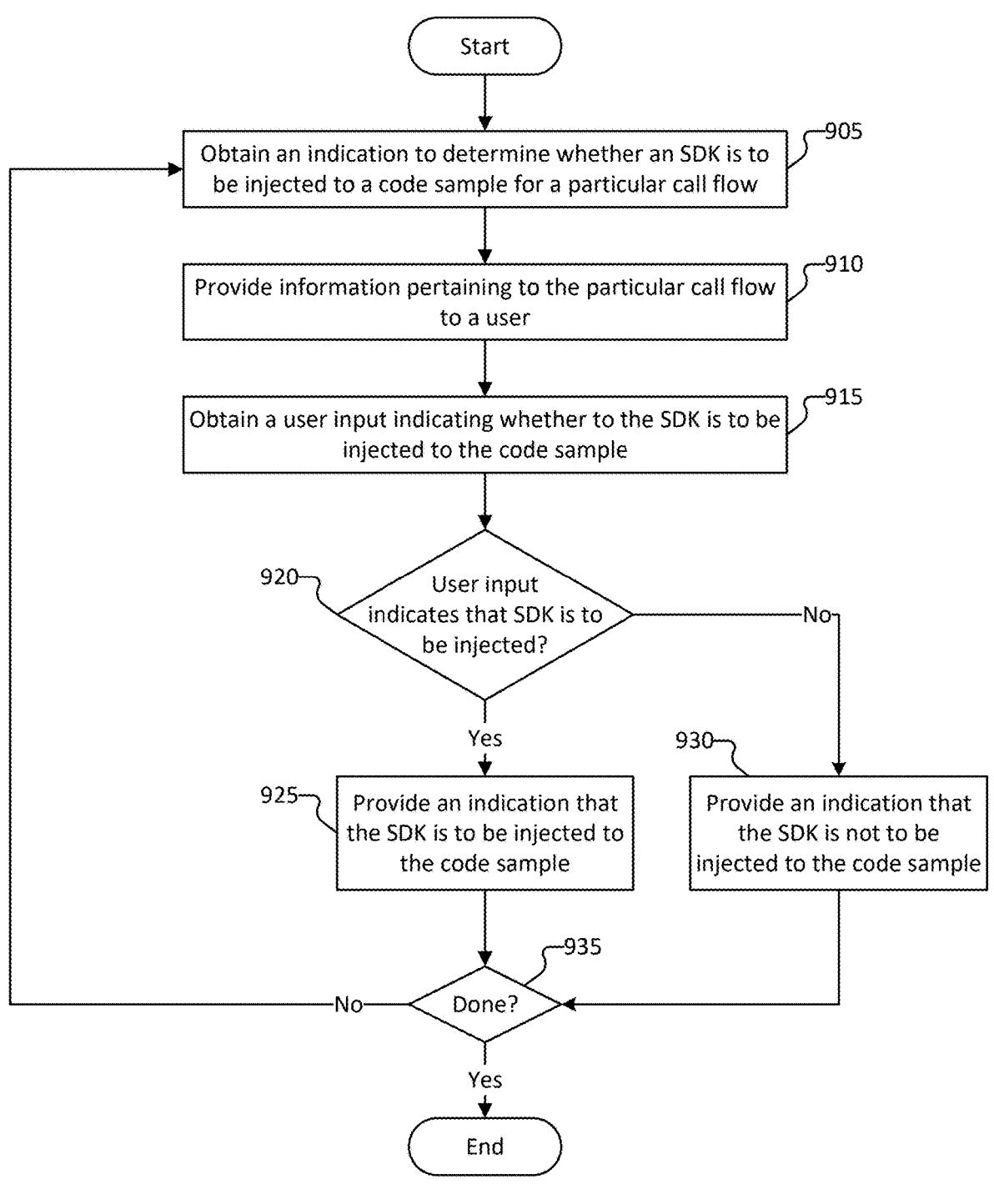
FIG. 9 is a flow diagram of a method for determining whether to inject an SDK sample according to various embodiments.

FIG. 9 is a flow diagram of a method for determining whether to inject an SDK sample according to various embodiments. In some embodiments, process 900 is implemented at least in part by system 100 of FIG. 1, system 200 of FIG. 2, and/or system 300 of FIG. 3. Process 900 may be implemented by an upstream device such as a worker node, a virtual machine, etc. Process 900 may be invoked by process 500 or 600 (e.g., at 615 of process 600).

At 905, the system obtains an indication to determine whether an SDK is to be injected to a code sample for a particular call flow. At 910, the system provides to a user information pertaining to the particular call flow. For example, the system presents to the user the call flow that may be a target for automatic SDK injection. At 915, the system obtains a user input indicating whether the SDK is to be injected to the code sample. At 920, the system determines whether the user input indicates that the SDK is to be injected to the code sample. In response to determining that the code sample matches the one or more predefined rules, process 900 proceeds to 925 at which the system provides an indication that the SDK is to be injected to the code sample. Conversely, in response to determining that the code sample does not match one or more predefined rules, process 900 proceeds to 930 at which the system provides an indication that the SDK is not to be injected to the code sample. The system can provide the indication(s) to another system, service, or process that invoked process 900, such as to 615 of process 600. At 935, a determination is made as to whether process 900 is complete. In some embodiments, process 900 is determined to be complete in response to a determination that no further SDK-injected code samples are to be obtained, no further call flows are to be processed, a codebase has been secured, a set SDK automatic injection targets have been processed/secured, an administrator indicates that process 900 is to be paused or stopped, etc. In response to a determination that process 900 is complete, process 900 ends. In response to a determination that process 900 is not complete, process 900 returns to 905.

Figure 10:
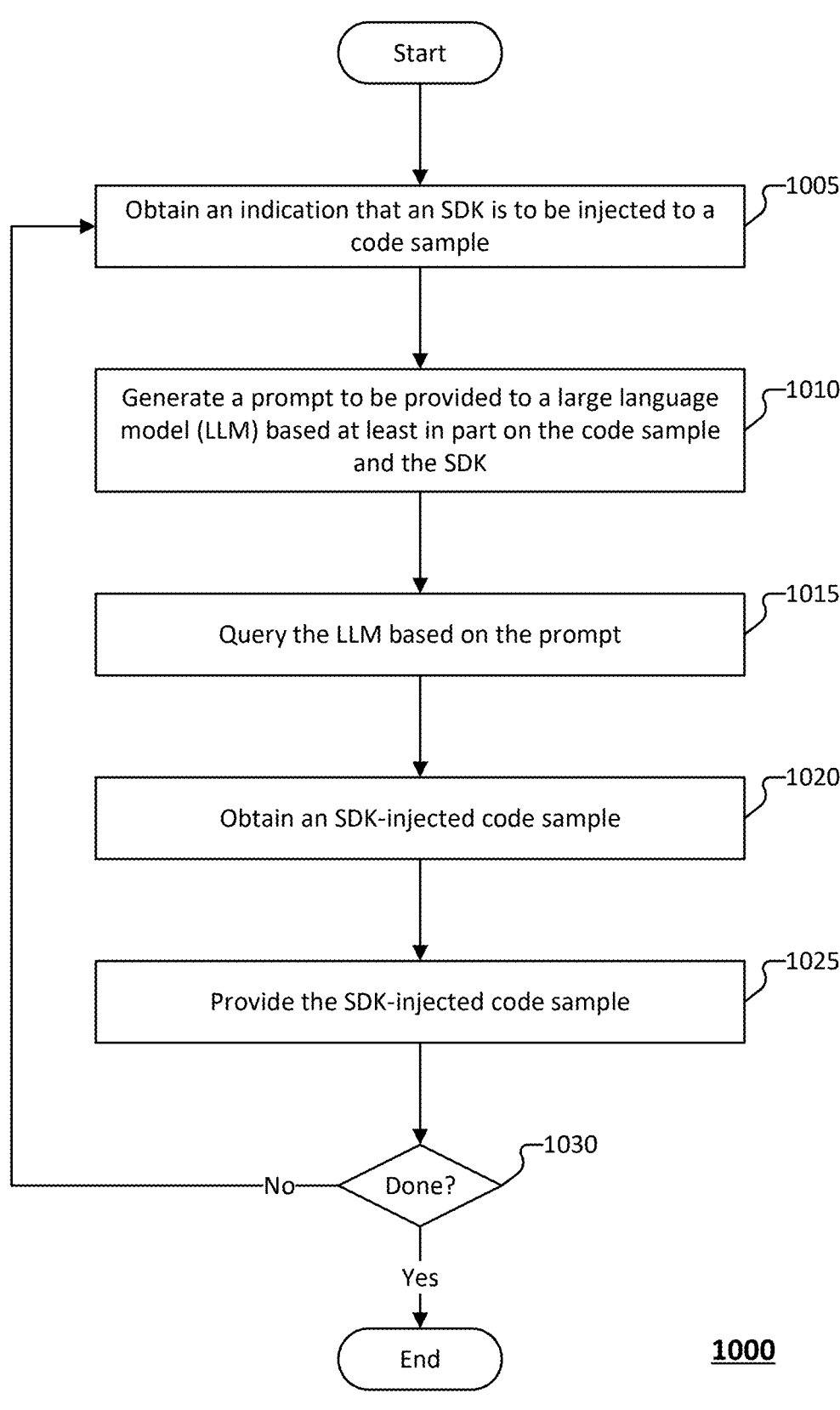
FIG. 10 is a flow diagram of a method for obtaining an SDK-injected code sample according to various embodiments.

FIG. 10 is a flow diagram of a method for obtaining an SDK-injected code sample according to various embodiments. In some embodiments, process 1000 is implemented at least in part by system 100 of FIG. 1, system 200 of FIG. 2, and/or system 300 of FIG. 3. Process 1000 may be implemented by an upstream device such as a worker node, a virtual machine, etc.

At 1005, the system obtains an indication that an SDK is to be injected to a code sample. At 1010, the system generates a prompt to be provided to a large language model (LLM) based at least in part on the code sample and the SDK. In some embodiments, the LLM comprises Llama3, Azure OpenAI, Vertex, etc. Various other LLMs may be implemented. The LLM to be queried to generate an SDK-injected code sample can be selected based at least in part on a language of the code sample. For example, different LLMs may handle certain software development languages with different accuracies. Certain LLMs may be better tuned or better trained for a particular software development language than other LLMs. At 1015, the system queries the LLM based on the prompt. At 1020, the system obtains an SDK-injected code sample. At 1025, the system provides the SDK-injected code sample. In some embodiments, the system provides the SDK-injected code sample to another system, service, or process that invoked process 1000, such as to 620 of process 600. As another example, the system provides the SDK-injected code sample to system, process, or service that analyzes the SDK-injected code sample to validate or vet the SDK-injected code sample before storing the SDK-injected code in a code repository (e.g., the codebase). The validating or vetting of the SDK-injected code can include ensuring that the SDK-injected code sample does not comprise a vulnerability. At 1030, a determination is made as to whether process 1000 is complete. In some embodiments, process 1000 is determined to be complete in response to a determination that no further SDK-injected code samples are to be obtained, an SDK-injected code sample is obtained for the code sample, a codebase has been secured, a set SDK automatic injection targets have been processed/secured, an administrator indicates that process 1000 is to be paused or stopped, etc. In response to a determination that process 1000 is complete, process 1000 ends. In response to a determination that process 1000 is not complete, process 1000 returns to 1005.

Figure 11:
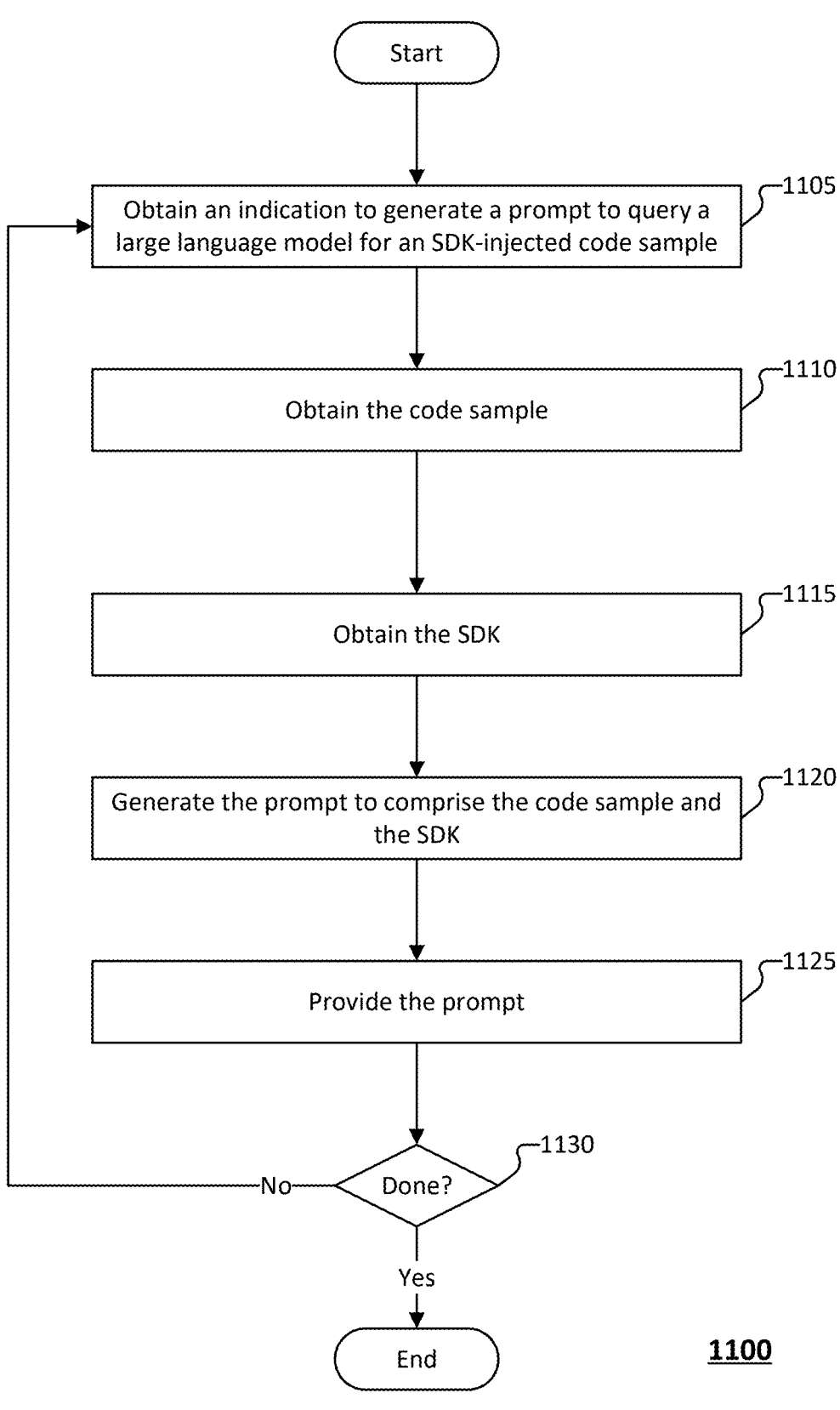
FIG. 11 is a flow diagram of a method for generating a prompt to a large language model to obtain an SDK-injected code sample according to various embodiments.

FIG. 11 is a flow diagram of a method for generating a prompt to a large language model to obtain an SDK-injected code sample according to various embodiments. In some embodiments, process 1100 is implemented at least in part by system 100 of FIG. 1, system 200 of FIG. 2, and/or system 300 of FIG. 3. Process 1100 may be implemented by an upstream device such as a worker node, a virtual machine, etc. Process 900 may be invoked by process 500 or 600 (e.g., at 620 of process 600).

At 1105, the system obtains an indication to generate a prompt to query a large language model for an SDK-injected code sample. The indication may indicate a particular code sample or associated call flow to which the SDK is to be injected. Additionally, the indication may indicate the particular SDK to be injected to the particular code sample. At 1110, the system obtains the code sample. At 1115, the system obtains the SDK. In some embodiments, the SDK is selected from among a set of SDKs. The SDK may be selected based at least in part on one or more of (a) a call flow comprised in the code sample, (b) a code repository from which the code sample is obtained, (c) a tenant (e.g., a customer) associated with the code repository, (d) a program or project associated with the codebase from which the code sample is obtained, etc. At 1120, the system generates the prompt to comprise the code sample and the SDK. At 1125, the system provides the prompt. In some embodiments, the system provides the prompt to another system, service, or process that invoked process 1100, such as to 620 of process 600. The system can send the prompt to the LLM in connection with querying the LLM to obtain the SDK-injected code sample. At 1130, a determination is made as to whether process 1100 is complete. In some embodiments, process 1100 is determined to be complete in response to a determination that no further prompts are to be generated, an SDK-injected code sample is obtained for the code sample, a codebase has been secured, a set SDK automatic injection targets have been processed/secured, an administrator indicates that process 1100 is to be paused or stopped, etc. In response to a determination that process 1100 is complete, process 1100 ends. In response to a determination that process 1100 is not complete, process 1100 returns to 1105.

Figure 12:
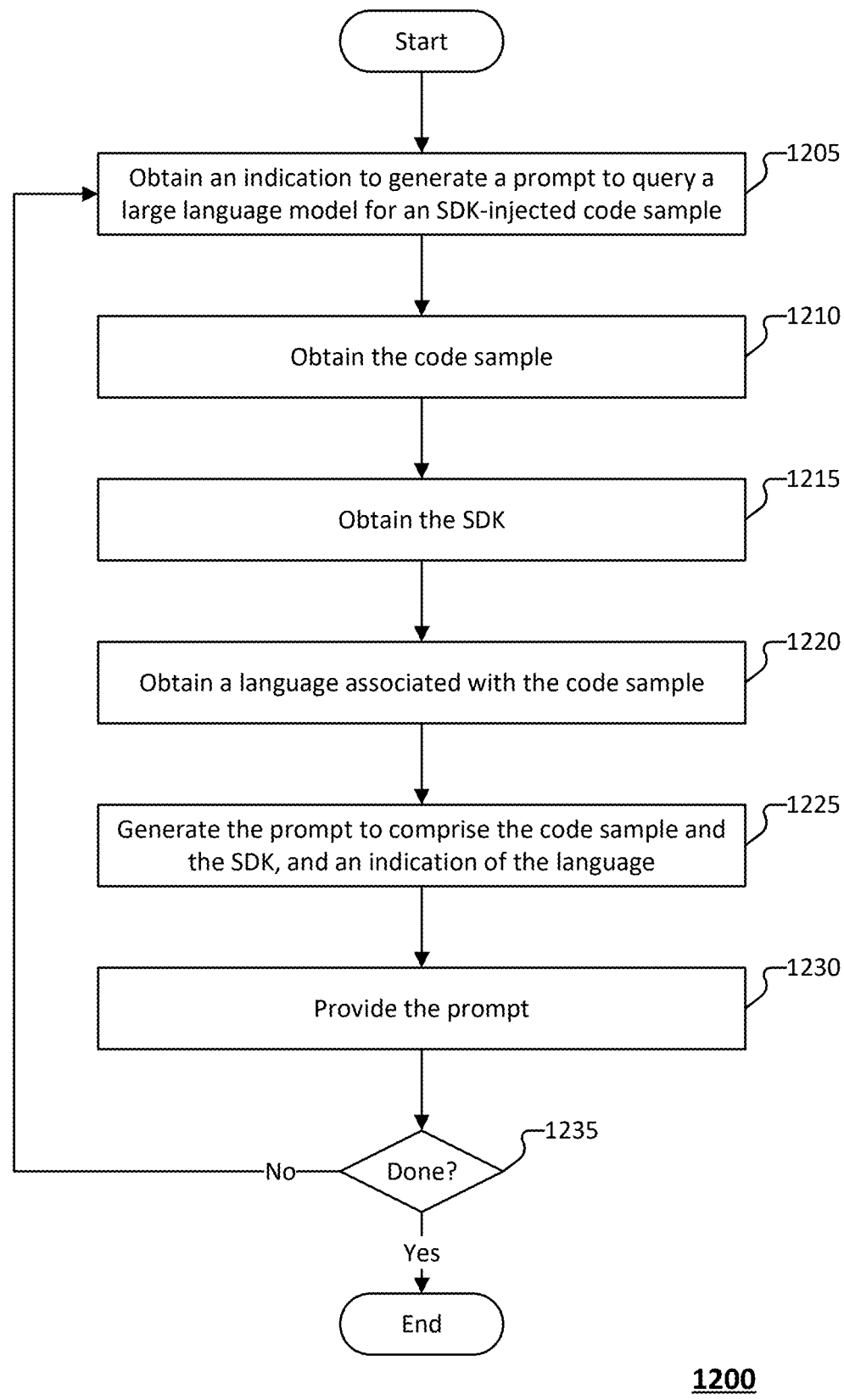
FIG. 12 is a flow diagram of a method for generating a prompt to a large language model to obtain an SDK-injected code sample according to various embodiments.

FIG. 12 is a flow diagram of a method for generating a prompt to a large language model to obtain an SDK-injected code sample according to various embodiments. In some embodiments, process 1200 is implemented at least in part by system 100 of FIG. 1, system 200 of FIG. 2, and/or system 300 of FIG. 3. Process 1200 may be implemented by an upstream device such as a worker node, a virtual machine, etc. Process 1200 may be invoked by process 500 or 600 (e.g., at 620 of process 600).

At 1205, the system obtains an indication to generate a prompt to query a large language model for an SDK-injected code sample. At 1210, the system obtains the code sample. At 1215, the system obtains the SDK. In some embodiments, 1205-1215 may be the same as, or similar to, 1105-1115 of process 1100, respectively. At 1220, the system obtains a language associated with the code sample. At 1225, the system generates the prompt to comprise the code sample, the SDK, and an indication of the language. At 1230, the system provides the prompt. In some embodiments, the system provides the prompt to another system, service, or process that invoked process 1100, such as to 620 of process 600. The system can send the prompt to the LLM in connection with querying the LLM to obtain the SDK-injected code sample. At 1235, a determination is made as to whether process 1200 is complete. In some embodiments, process 1200 is determined to be complete in response to a determination that no further prompts are to be generated, an SDK-injected code sample is obtained for the code sample, a codebase has been secured, a set SDK automatic injection targets have been processed/secured, an administrator indicates that process 1200 is to be paused or stopped, etc. In response to a determination that process 1200 is complete, process 1200 ends. In response to a determination that process 1200 is not complete, process 1200 returns to 1205.

Figure 13:
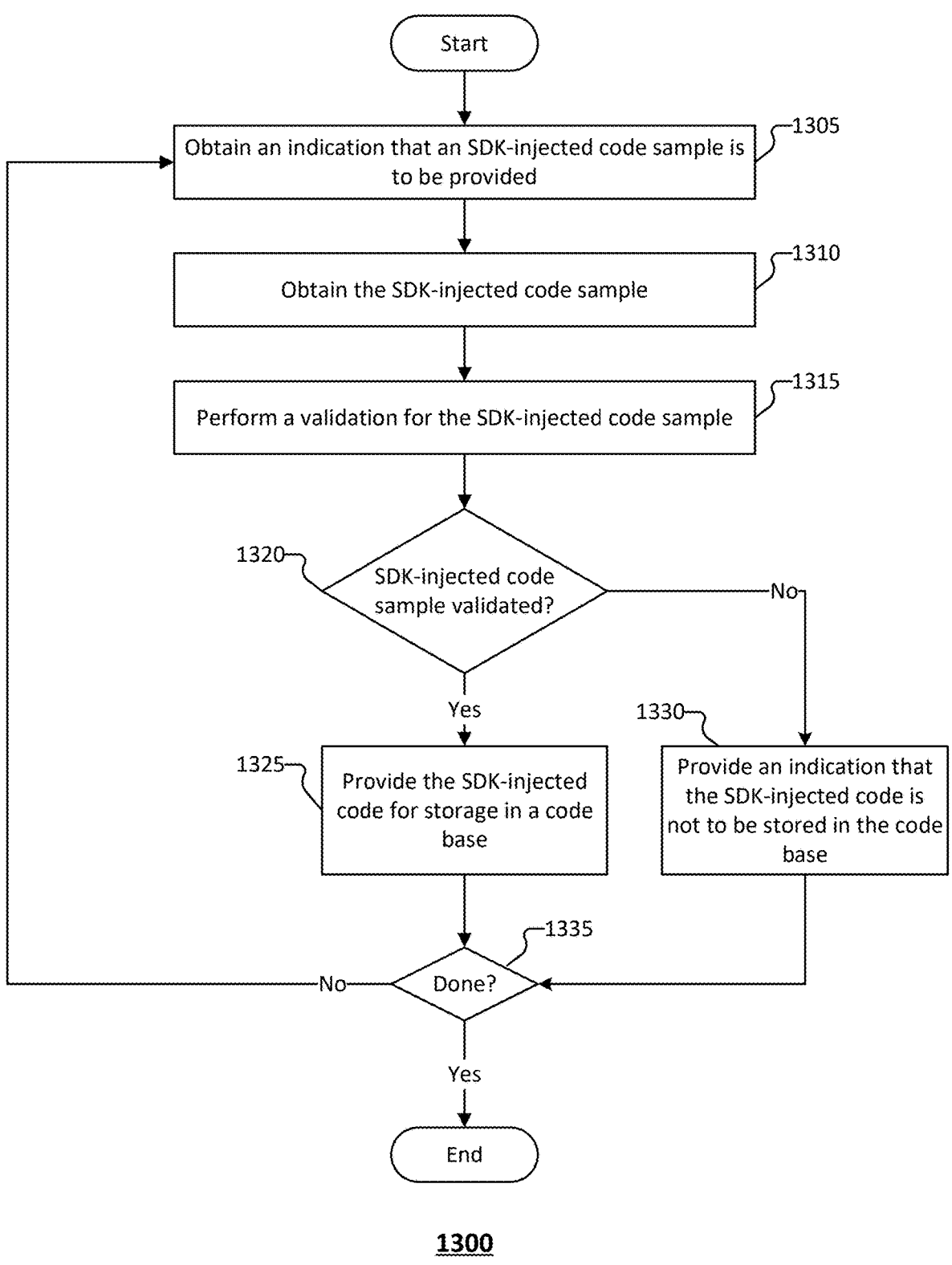
FIG. 13 is a flow diagram of a method for providing an SDK-injected code sample according to various embodiments.

FIG. 13 is a flow diagram of a method for providing an SDK-injected code sample according to various embodiments. In some embodiments, process 1300 is implemented at least in part by system 100 of FIG. 1, system 200 of FIG. 2, and/or system 300 of FIG. 3. Process 1300 may be implemented by an upstream device such as a worker node, a virtual machine, etc. Process 1300 may be invoked by process 500 or 600 (e.g., at 625 of process 600).

At 1305, the system obtains an indication that an SDK-injected code sample is to be provided. For example, the system determines that the SDK-injected code sample is to be stored in a code repository (e.g., a codebase) to replace the code sample to which the SDK was injected. At 1310, the system obtains the SDK-injected code sample. For example, the indication obtained in 1305 may comprise an identifier associated with the SDK-injected code sample to be provided (e.g., stored in the codebase). At 1315, the system performs a validation for the SDK-injected code sample. At 1320, the system determines whether the SDK-injected code sample is validated. For example, the system determines whether the SDK-injected code sample operates normally and/or is not subject to one or more predefined vulnerabilities or types of vulnerabilities. In response to determining that the SDK-injected code sample is validated, process 1300 proceeds to 1325 at which the system provides the SDK-injected code for storage in a codebase. Conversely, in response to determining that the SDK-injected code sample is not validated, process 1300 proceeds to 1330 at which the system provides an indication that the SDK-injected code is not to be stored in the codebase. For example, in response to determining that the SDK-injected code sample is not validated, the system can discard the SDK-injected code sample or provide the SDK-injected code sample to another system or service to remediate the SDK-injected code sample (e.g., the system can query the LLM to correct/adjust the SDK-injected code sample). At 1335, a determination is made as to whether process 1300 is complete. In some embodiments, process 1300 is determined to be complete in response to a determination that no further SDK-injected code samples are to be validated, a codebase has been secured, a set SDK automatic injection targets have been secured, an administrator indicates that process 1300 is to be paused or stopped, etc. In response to a determination that process 1300 is complete, process 1300 ends. In response to a determination that process 1300 is not complete, process 1300 returns to 1305.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for securing code, comprising:
one or more processors configured to:
    obtain a code sample;
    detect a call flow associated with the code sample;
    determine whether to inject a software development kit (SDK) to the code sample based at least in part on the call flow; and
    in response to determining to inject the SDK to the code sample,
        automatically inject the SDK to the code sample to obtain an SDK-injected code sample; and
        provide the SDK-injected code sample; and
a memory coupled to the one or more processors and configured to provide the one or more processors with instructions.

2. The system of claim 1, wherein automatically injecting the SDK to the code sample to obtain an SDK-injected code sample comprises:
querying a large language model (LLM) for the SDK-injected code sample.

3. The system of claim 2, wherein querying the LLM for the SDK-injected code sample comprises:
prompting the LLM based at least in part on the code sample and the SDK to be injected.

4. The system of claim 3, wherein querying the LLM for the SDK-injected code sample comprises:
generating a prompt to send to the LLM; and
providing the prompt to the LLM.

5. The system of claim 4, wherein the prompt comprises the code sample and the SDK to be injected.

6. The system of claim 4, wherein the prompt comprises the code sample and an indication of the SDK to be injected.

7. The system of claim 4, wherein the prompt comprises the code sample, an indication of the SDK to be injected, and a software language according to which the SDK is to be injected.

8. The system of claim 2, wherein the LLM refactors code comprised in the code sample to inject the SDK.

9. The system of claim 2, wherein:
the LLM determines whether to translate the SDK to inject the SDK into the code sample; and
in response to determining to translate the SDK, injecting the SDK to the code sample in a manner that configures the SDK according to a native language of the code sample.

10. The system of claim 1, wherein the SDK is a lightweight SDK.

11. The system of claim 1, wherein the SDK causes the SDK-injected code sample to perform an authentication with a security service, and querying a cloud service to perform a workload associated with the code sample in response to determining the authentication with the security service is successful.

12. The system of claim 11, wherein causing the SDK-injected code sample to perform the authentication with the security service comprises causing the SDK-injected code sample to communicate a token to the security service.

13. The system of claim 1, wherein the SDK is determined to be injected to the code sample based at least in part on one or more predefined rules.

14. The system of claim 1, wherein the SDK is determined to be injected to the code sample based at least in part on a user input.

15. The system of claim 1, wherein obtaining the code sample and detecting the call flow associated with the code sample comprises:
obtaining a codebase;
detecting a set of call flows in the codebase; and
identify the code sample based at least in part on a particular call flow of the set of call flows.

16. The system of claim 1, wherein determining whether to inject the SDK to the code sample comprises:
obtaining the call flow associated with the code sample;
providing results to a client system associated with a user; and
receiving a user input from the client system, the user input comprises an indication of whether to inject the SDK to the code sample.

17. The system of claim 1, wherein providing the SDK-injected code sample comprises storing the SDK-injected code sample in a codebase repository.

18. The system of claim 1, wherein providing the SDK-injected code sample comprises:
validating the SDK-injected code sample; and
in response to determining that SDK-injected code sample is validated, storing the SDK-injected code sample in a codebase repository.

19. The system of claim 1, wherein the call flow is determined based at least in part on analyzing the code sample based at least in part on an abstract syntax tree (AST).

20. The system of claim 4, wherein the prompt further comprises one or more few-shot examples illustrating how to integrate the SDK into code samples, and wherein the LLM generates the SDK-injected code sample based at least in part on the few-shot examples to ensure contextual integration of the SDK with the call flow of the code sample.

21. The system of claim 1, wherein determining whether to inject the SDK to the code sample comprises applying one or more heuristics including language support for the code sample and dynamic dependency injection feasibility, and wherein the injection is performed only if the code sample passes the one or more heuristics to enable scalable use of the LLM across a codebase.

22. The system of claim 18, wherein validating the SDK-injected code sample comprises performing a static analysis to confirm that the SDK-injected code sample functions as intended without introducing vulnerabilities, and wherein storing the SDK-injected code sample in the codebase repository comprises creating a dedicated branch and initiating a pull request for review.

23. A method for securing code, comprising:
obtaining a code sample;
detecting a call flow associated with the code sample;

determining whether to inject a software development kit (SDK) to the code sample based at least in part on the call flow; and in response to determining to inject the SDK to the code sample, automatically injecting the SDK to the code sample to obtain an SDK-injected code sample; and providing the SDK-injected code sample.

24. A computer program product embodied in a non-transitory computer readable medium and comprising computer instructions for:

obtaining a code sample detecting a call flow associated with the code sample;

determining whether to inject a software development kit (SDK) to the code sample based at least in part on the call flow; and in response to determining to inject the SDK to the code sample, automatically injecting the SDK to the code sample to obtain an SDK-injected code sample; and providing the SDK-injected code sample.

\* \* \* \* \*